United States Patent
Li et al.

(10) Patent No.: US 7,054,485 B2
(45) Date of Patent: May 30, 2006

(54) IMAGE PROCESSING METHOD, APPARATUS AND SYSTEM

(75) Inventors: Yulin Li, Beijing (CN); Jie Wang, Beijing (CN); Hongsheng Zhao, Beijing (CN)

(73) Assignee: Canon Kabushiki Kaisha, Tokyo (JP)

( * ) Notice: Subject to any disclaimer, the term of this patent is extended or adjusted under 35 U.S.C. 154(b) by 660 days.

(21) Appl. No.: 10/193,262

(22) Filed: Jul. 12, 2002

(65) Prior Publication Data

US 2003/0063802 A1    Apr. 3, 2003

(30) Foreign Application Priority Data

Jul. 26, 2001    (CN)    ................ 01 1 24725

(51) Int. Cl.
*G06K 9/00*    (2006.01)

(52) U.S. Cl. .............. 382/172; 382/171; 382/173

(58) Field of Classification Search .......... 382/199, 382/171, 172
See application file for complete search history.

(56) References Cited

U.S. PATENT DOCUMENTS

| | | | |
|---|---|---|---|
| 4,722,008 A | 1/1988 | Ibaraki et al. | 358/283 |
| 5,379,130 A * | 1/1995 | Wang et al. | 358/462 |
| 5,583,659 A | 12/1996 | Lee et al. | 358/455 |
| 5,754,312 A | 5/1998 | Fujimoto et al. | 358/462 |
| 6,094,508 A * | 7/2000 | Acharya et al. | 382/199 |
| 6,192,153 B1 | 2/2001 | Suzuki et al. | 382/199 |
| 6,813,386 B1 * | 11/2004 | Noguchi et al. | 382/237 |

FOREIGN PATENT DOCUMENTS

| | | |
|---|---|---|
| EP | 0096219 A2 * | 12/1983 |
| JP | 61-194968 | 8/1986 |
| JP | 6-150059 | 5/1994 |
| JP | 8-149297 | 6/1996 |

OTHER PUBLICATIONS

Perez et al., "Dynamic Threshold Selection For Image Segmentation of Natural Structures Based Upon a Performance Criterion", 3ECPA-3 European Conf. On Precision Agriculture, Montpellier. Jun. 2001.*

Kittler et al., "Minimum Error Thresholding", Pattern Recognition vol. 19 No. 1 p. 41-47, 1985.*

Krishnapuram, Handbook of Fuzzy Computation, Chapters F7.3-F7.4, 1998.*

(Continued)

*Primary Examiner*—Jingge Wu
*Assistant Examiner*—Jordan Kuhn
(74) *Attorney, Agent, or Firm*—Fitzpatrick, Cella, Harper & Scinto

(57) ABSTRACT

A method for detecting edges in an image is disclosed along with corresponding apparatus and system for accurately extracting edges in the image. The edge detecting apparatus comprises a reading means, an image gray-level statistical means, an image classification means, a segmenting threshold generating means, an edge criterion determining means, and an image edge extracting means. The present invention realizes a reliable and accurate method for detecting edges in an image so as to extract edges in various file images.

13 Claims, 24 Drawing Sheets

OTHER PUBLICATIONS

Nobuyuki Otsu, "A Threshold Selection Method from Gray-Level Histograms," IEEE Trans. On Systems, Man, and Cybernetics, vol. SMC-9, No. 1, pp. 62-66, Jan. 1979.

Oivind Due Trier and Anil K. Jain, "Goal-Directed Evaluation of Binarization Methods," IEEE Trans. On Pattern Analysis And Machine Intelligence, vol. 17, No. 12, pp. 1191-1201, Dec. 1995.

Runsheng Wang, *Image Analysis*, Section 3.6.2 (Oct. 1995, ISBN 7-81024-313-6).

Yujin Zhang, *Image Segmentation*, pp. 9-19 (Feb. 2001, ISBN 7-03-007241-3).

Henstock, P.V. et al., "Automatic Gradient Threshold Determination for Edge Detection", IEEE Trans. on Image Proc., vol. 5, No. 5, May 1996, pp. 784-787.

Otsu, N., "A Threshold Selection Method from Gray-Level Histograms", IEEE Trans. on Systems, Man and Cybernetics, vol. 9, No. 1, Jan. 1979, pp. 62-66.

Rosin, P., "Edges: saliency measures and automatic thresholding", Mach. Vision and Applns., vol. 9, No. 4, 1997, pp. 139-159.

Search Report, dated Aug. 3, 2004, in EP 02 25 5149.

* cited by examiner

Fig. 10C

| -1 | 0 | 1 |
|----|---|---|
| -2 | 0 | 2 |
| -1 | 0 | 1 |

| 1  | 2  | 1 |
|----|----|---|
| 0  | 0  | 0 |
| -1 | -2 | 1 |

Fig. 11

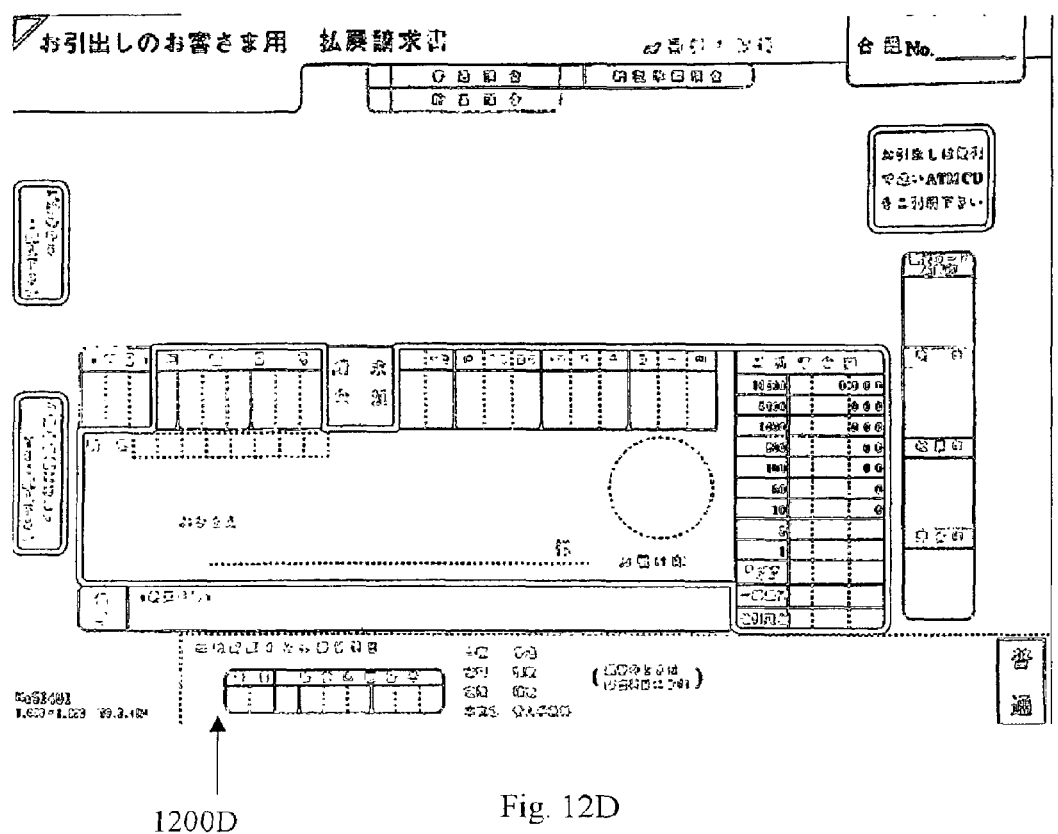
1200D  Fig. 12D

1200E

IMAGE PROCESSING METHOD, APPARATUS AND SYSTEM

FIELD OF THE INVENTION

The present invention relates to an image processing method and apparatus as well as an image processing system, particularly relates to a method, apparatus, and system for detecting edges in an image, and storage medium.

BACKGROUND OF THE INVENTION

It is often desired that an input image from an input device such as scanner or digital camera can be reproduced with high quality. To produce a digital quality with high quality, appropriate image process needs to be performed on input image. With the current digital image processing technology, an image of high quality can be generated.

However, problems exist in the prior art image processing technology. In general, an input image can be divided into a character portion, a photographic portion, and a dot portion. When a dot image is processed using a filtering method, due to the influence of sampling rate and pixel, the input image often blurs. On the other hand, when a file containing a dot image, a character image and a photographic image is processed, the produced image often contains undesired dots in its character portion, and the edge of the characters become unclear.

Edge detection is very important in digital image processing. Generally, edges in an image can show the shape of objects in an image, which is important both for displaying the objects and for analyzing the image. Thus, edge detection is key for solving many complex questions in the field of digital image processing.

For example, Japanese Laid-Open Patent Publication No. 6-150059 discloses an image separating method and a separating apparatus, in which the separating precision of an image area is improved by determining the concentrated portion of the lattices and lines in the image as a character portion. In this publication, an image is divided into blocks each containing a plurality of pixels, and the type of the image is recognized by pattern matching; a plurality of reference image patterns are preset, and the type of an input image is determined by comparing the image with the reference patterns.

In addition, Japanese Laid-Open Patent Publication No. 8-149297 discloses a method for determining whether a pixel to be observed is contained in a dot image portion, wherein the periodicity of the image data of lines in the dot image is detected by using the periodicity of the image data of the dot image.

Moreover, Japanese Laid-Open Patent Publication No. 61-194968 discloses a method for recognizing a dot image area, wherein whether the pixel to be observed is in the portion of the dot image area or not is determined by measuring the pixels in blocks having different signal levels in a main scanning direction and a sub-scanning direction.

In a gray-level image, an edge is consisted of the pixels that appear at positions where the gray-level varies greatly. Such a variation of gray-level can be detected using a derivative method. The book "Image Segmentation", by Zhang, Yujin (Scientific Book Series in Images and Graphics, Science Press, 2000, ISBN 7-03-007241-3) discusses some of the most frequently used methods for detecting an edge in an image using $1^{st}$ order derivative, such as Roberts operator, Sobel operator, Prewitt operator, etc. If the calculated derivative of the gray-level of the image at a pixel is greater than a preset threshold (an image edge detecting threshold), then the pixel is determined as an edge pixel of the image.

U.S. Pat. No. 6,192,153B1 discloses an image processing method and apparatus. It performs process for each pixel by precisely identifying the type of each image area of the image to be detected. The image process apparatus of U.S. Pat. No. 6,192,153B1, comprises an image edge detecting means for detecting pixels at an edge in the image by calculating the product of each image signal in an area and a filter factor, wherein the area contains a target pixel and a plurality of pixels surrounding the target pixel, and a labeling means for labeling an image area containing the target pixel in accordance with the result of the edge detecting. The image processing method of U.S. Pat. No. 6,192,153B1 comprises the following step: inputting the digital image signal; reversing the digital image; detecting edges in the image; classifying each pixel into a photographic pixel and a non-photographic pixel according to the characteristics of each pixel; classifying the non-photographic pixel; and, smoothing the photographic pixel so as to output the obtained image signal.

U.S. Pat. No. 5,583,659 discloses a multi-windowing technique for thresholding an image using local image properties, which uses features such as luminance variations of a local image and gradient variation of image pixels and reduces the noise of the image and lowers the blurring at edges in the image using multi-windowing technique. In the method of U.S. Pat. No. 5,583,659, an edge in the image is detected using Sobel operator and a predetermined fixed edge criterion threshold.

In practice, edge criterion threshold needs to be adjusted based on the difference between images to be processed, so as to obtain good edge detection result of both extracting edges as completely as possible and avoiding producing too much noise in the extracted image. In the prior art, as in the above-mentioned two US patents, fixed threshold is used for edge criterion, so satisfactory result cannot be obtained.

SUMMARY OF THE PRESENT INVENTION

Accordingly, the present invention aims at providing an image processing method, an image processing apparatus and an image processing system for quickly and effectively calculating an image edge criterion threshold, which is suitable for a particular image, in a self-adapted manner based on the features of the image, thereby detecting the image edges in the image using the criterion.

Further, the present invention aims at providing a novel image processing method, a novel image processing apparatus, and a novel image processing system.

According to the present invention, the above aims are realized by providing an image processing method, which comprises:

a gray-level statistical step for calculating frequency of gray-level in an original image;

an image classifying step for classifying the original image based on the calculated frequency;

a segmenting threshold calculating step for calculating a segmenting threshold based on the result of the classifying step, the segmenting threshold being used for dividing a foreground and a background in the original image;

an edge criterion calculating step for calculating a statistical value of the foreground and a statistical value of the background and using these statistical value for calculating an edge criterion;

an edge extracting step for extracting edges in the image based on the calculated edge criterion.

Moreover, the above aim is realized by providing a image processing apparatus for detecting edges in an image, comprising:

a gray-level statistical means for calculating frequency of gray-level in an original image;

an image classifying means for classifying the original image based on the calculated frequency;

a segmenting threshold calculating means for calculating a segmenting threshold based on the result of the classifying means, the segmenting threshold being used for dividing a foreground and a background in the original image;

an edge criterion calculating means for calculating a statistical value of the foreground and a statistical value of the background and using these statistical value for calculating an edge criterion;

an edge extracting means for extracting edges in the image based on the calculated edge criterion.

Further, the above aim is realized by providing a image processing system, comprising:

an input portion for inputting an image;

an image processing portion for detecting edges in the image; and an output portion for outputting the detected edges in the image, wherein the image processing portion comprises:
a gray-level statistical means for calculating frequency of gray-level in an original image;
an image classifying means for classifying the original image based on the calculated frequency;
a segmenting threshold calculating means for calculating a segmenting threshold based on the result of the classifying means, the segmenting threshold being used for dividing a foreground and a background in the original image;
an edge criterion calculating means for calculating a statistical value of the foreground and a statistical value of the background and using these statistical value for calculating an edge criterion;
an edge extracting means for extracting edges in the image based on the calculated edge criterion.

Further, the present invention provides a storing medium for storing program codes for image processing, wherein the program codes comprises:

a program code for calculating frequency of gray-level in an original image;

a program code for classifying the original image based on the calculated frequency;

a program code for calculating a segmenting threshold based on the result of the classification of the original image, the segmenting threshold being used for dividing a foreground and a background in the original image;

a program code for calculating a statistical value of the foreground and a statistical value of the background and using these statistical value for calculating an edge criterion;

a program code for extracting edges in the image based on the calculated edge criterion.

Further, the present invention provides an image processing method for detecting edges in an image, characterized in that by comprising:

a gray-level statistical step for calculating frequency of gray-level in an original image;

a black block detecting step for detecting an image area corresponding to a black block in the original image;

a black block pixel frequency removing step for removing the frequency of the pixels in the detected black block from the gray-level frequency calculated in the gray-level statistical step;

an image classifying step for classifying the original image based on the distribution of the frequency of gray-level of the original image, from which the frequency of pixels in the black block has bee removed;

a segmenting threshold calculating step for calculating a segmenting threshold based on the result of the classifying step, the segmenting threshold being used for dividing a foreground and a background in the original image;

an edge criterion calculating step for calculating a statistical value of the foreground and a statistical value of the background with the black block being removed and using these statistical value for calculating an edge criterion;

an edge extracting step for extracting edges in the image based on the calculated edge criterion.

Further, the present invention provides an image processing apparatus for detecting edges in an image, characterized in that the apparatus comprises:

a gray-level statistical means for calculating frequency of gray-level in an original image;

a black block detecting means for detecting an image area corresponding to a black block in the original image;

a black block pixel frequency removing means for removing the frequency of the pixels in the detected black block from the gray-level frequency calculated in the gray-level statistical means;

an image classifying means for classifying the original image based on the distribution of the frequency of gray-level of the original image, from which the frequency of pixels in the black block has bee removed;

a segmenting threshold calculating means for calculating a segmenting threshold based on the result of the classifying means, the segmenting threshold being used for dividing a foreground and a background in the original image;

an edge criterion calculating means for calculating a statistical value of the foreground and a statistical value of the background with the black block being removed and using these statistical value for calculating an edge criterion;

an edge extracting means for extracting edges in the image based on the calculated edge criterion.

Further, the present invention provides a storing medium for storing program codes for image processing, wherein the program codes comprises:

a program code for calculating frequency of gray-level in an original image;

a program code for detecting an image area corresponding to a black block in the original image;

a program code for removing the frequency of the pixels in the detected black block from the gray-level frequency calculated;

a program code for classifying the original image based on the distribution of the frequency of gray-level of the original image, from which the frequency of pixels in the black block has bee removed;

a program code for calculating a segmenting threshold based on the result of the classification, the segmenting threshold being used for dividing a foreground and a background in the original image;

a program code for calculating a statistical value of the foreground and a statistical value of the background with the black block being removed and using these statistical value for calculating an edge criterion;

a program code for extracting edges in the image based on the calculated edge criterion.

The method for extracting image edges of the present invention can dynamically determine an edge criterion according to the variation of image type of an original image by changing the segmenting threshold for dividing a foreground and a background of the original image base on the gray-level frequency distribution of the original image, so as to perform accurate edge extraction.

Other aims and advantages of the present invention will become apparent from the below description of the preferred embodiments of the present invention with reference to the accompanying drawings, in which same reference numbers are used for the same or similar parts and which form a part of the specification of the present application for explaining the principles of the present invention.

BRIEF DESCRIPTION OF THE DRAWINGS

FIG. 10C shows the result of image edge detection of the image shown in FIG. 9A according to the first embodiment of the present invention;

FIG. 11 illustrates a 3×3 Sobel gradient operator for calculating gradient of gray-level;

FIG. 12D is the result of edge detection obtained from the original image of FIG. 12A with the flowchart of FIG. 3;

DESCRIPTION OF THE PREFERRED
EMBODIMENTS OF THE PRESENT
INVENTION

The preferred embodiments of the present invention will be described below with reference to the accompanying drawings.

First Embodiment

System Arrangement

Figure 1:
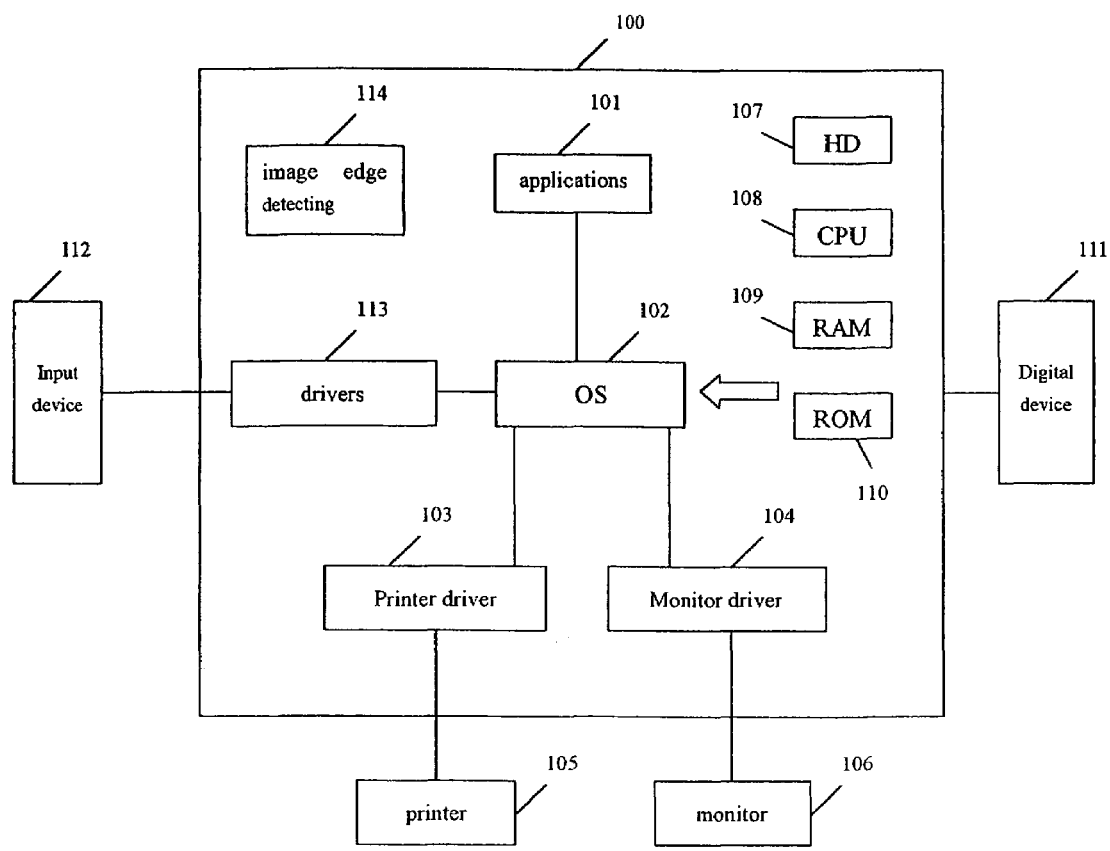
FIG. 1 is a block diagram showing the hardware arrangement of the image edge detecting system of the first and second embodiments of the present invention.

FIG. 1 shows a structural block diagram of the image edge detecting system according to the first embodiment of the present invention.

A printer 105, such as an ink jet printer and the like, and a monitor 106 are connected with a host computer 100.

The host computer 100 has an application program 101, such as a word processing program, a scaling program, an Internet browser and the like, an OS (operating system) 102, a printer driver program 103 for processing various drawing commands (image drawing command, letter drawing command, graphics drawing command) indicating output images, which are issued by the application program 101 to the OS 102, and generating printing data, and a monitor driver 104 for processing various drawing commands issued by the application program 101 and displaying data on the monitor 106.

Reference number 112 denotes an instruction inputting device, and 113 denotes its device driver, for example, a mouse is connected, which points various information displayed on the monitor 106 to issue various instructions to the OS 102. it is to be noted that other pointing devices may be used in place of a mouse, such as a tracking ball, a pen, a touch panel, and the like.

The host computer 100 comprises, as various hardware that can run these programs, a CPU (central processing unit) 108, a hard disk (HD) 107, a random access memory (RAM) 109, a read-only memory (ROM) 110, and the like.

As an example of the image edge detecting system shown in FIG. 1, Windows 98 available from Microsoft Corp., is installed as an OS in a PC-AT compatible personal computer available from IBM Corp., application programs necessary for implementing printing are installed, and a monitor and a printer are connected to the personal computer.

In the host computer 100, each application 101 generates data of output images using text data such as characters and the like classified into text, graphic data such as figures and the like classified into graphic data, and image data classified into natural image and the like, etc. when the printer prints out image data, the application 101 issues an printing request to the OS 102. at this time, the application 101 sends out a group of drawing commands to OS 102, which includes a graphic drawing command corresponding to graphic data and an image drawing command corresponding to image data.

After OS 102 receives the print out request from the application 101, it issues a drawing command group to the printer driver 103 corresponding to a printer. The printer driver 103 processes the printing request and drawing command group from the OS 102, produces printing data which the printer 105 can print out, and transfers the printing data to the printer 105. if the printer 105 is a rasterizing printer, the printer driver 103 performs an image correction process for the drawing commands from OS 102 and then rasterizes the commands sequentially on a RGB 24-bit page memory. Upon completion of rasterization of all the drawing commands, the printer driver 103 converts the contents of the RGB 24-bit page memory into a data format that the printer 105 can print out, e.g., CMYK data, and transfers the converted data to the printer 105.

It is to be noted that the host computer 100 may be connected with an image scanner 111, which senses an image of an object and generates RGB image data and can load and store the sensed image data in the HD 107. it is also to be noted that the image data sensed by the image scanner 111 is encoded by BMP. The sensed image data can be transferred as image data to the printer 105 after it is decoded by the printer driver 103.

The host computer 100 further comprises an image edge detecting apparatus 114 for detecting edges in an image. The image data stored in HD 107 is read out and processed by the image edge detecting apparatus 114. first, defined image edges are detected. Then, under the control of OS 102, the detected edges in the image are outputted by the printer 105 or the monitor 106.

Image Edge Detecting Apparatus

Figure 2:
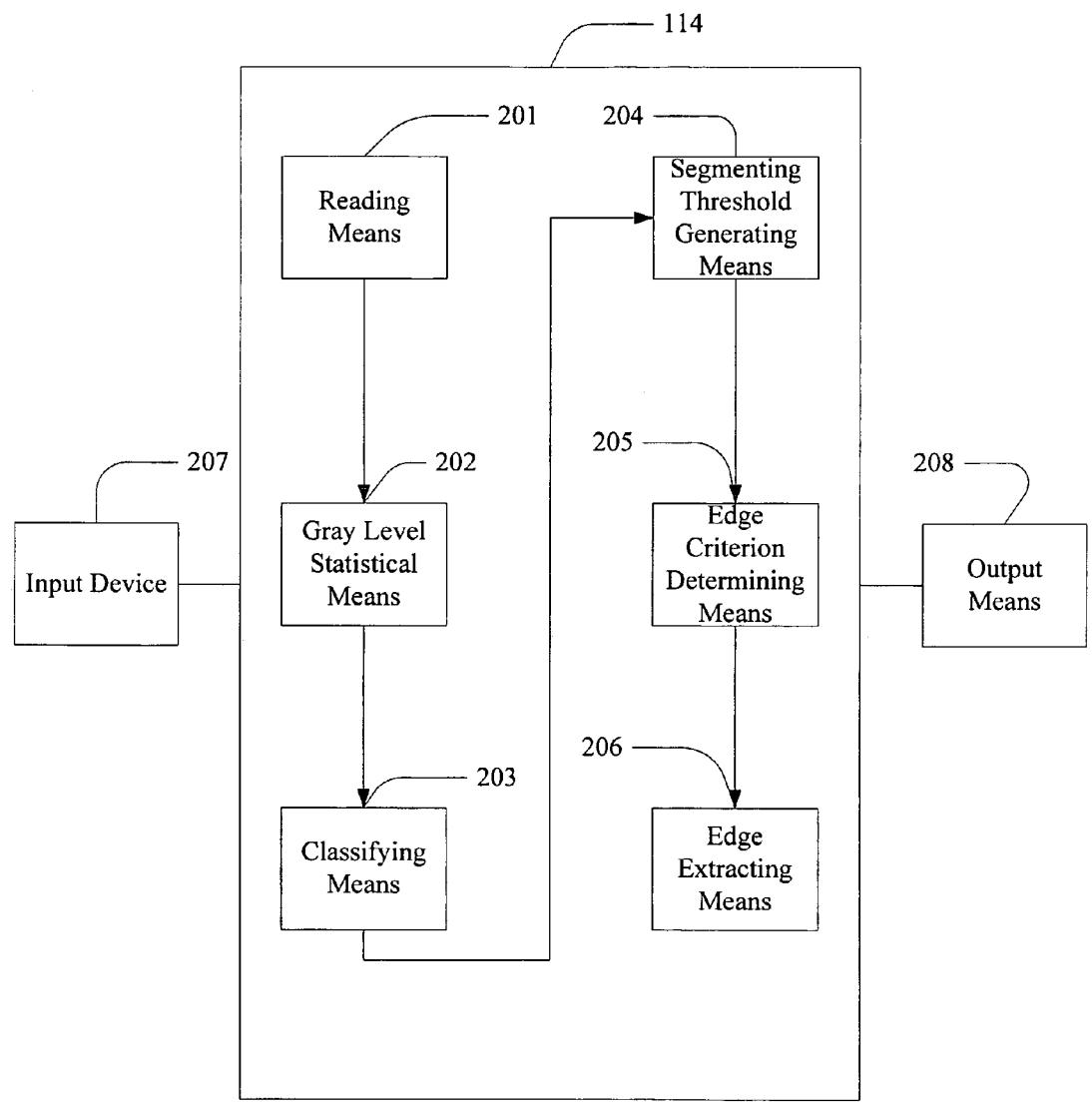
FIG. 2 is a block diagram showing the arrangement of the image edge detecting apparatus of the first embodiment of the present invention.

FIG. 2 is a block diagram showing an arrangement of an image edge detecting apparatus according to the first embodiment of the present invention.

The image edge detecting apparatus of the present embodiment comprises an image reading means 201, an image gray-level statistical means 202, an image classifying means 203, a segmentation threshold determining means 204, an image edge criterion determining means 205 and an image edge extracting means 206.

An image input device, such as a scanner, photo-electrically reads an inputting original image from an original. The analog signal indicating the original image is converted into a digital image signal. The digital image signal is stored into a storage device such as the HD 107 or ROM 110 or the like.

In the image edge detecting apparatus 114, the reading means 201 first reads the digital image signal stored in the storage device, such as ROM 110 or the like, and supplies the read image signal to the image gray-level statistical means 202.

The image gray-level statistical means 202 converts various images, such as color images, Tiff images, etc., which are read by the reading means 201, into gray-level images, and calculates a gray-level histogram of the frequency of occurrence of pixels of different gray-levels.

According to the gray-level histogram calculated by the image gray-level statistical means 202, the image classifying means 203 calculates an initial segmenting threshold for segmenting a foreground and a background in the gray-level histogram.

In the present invention, in accordance with the features of the gray-level histogram, an image to be processed is classified into one of three categories: type 0, type I and type II.

Figure 8A:
FIG. 8A shows an example of an original image for which image edges are to be detected.

An image of type 0 is a normal image, which can be properly segmented into a foreground and a background using the initial segmenting threshold. Here, the foreground of an image comprises various information to be shown with the image, such as characters, charts, lines, etc. while the background of an image includes information for decorating or foiling the foreground of the image, such as the base color(s) of the image, etc. the image 800A shown in FIG. 8A is an example of an image of type 0.

An image of type I is an image which, when being segmented into a foreground and a background using the initial segmenting threshold, has an inaccurate foreground, i.e. a part of its foreground is segmented into its background.

An image of type II is an image which, when being segmented into a foreground and a background using the initial segmenting threshold, has an inaccurate background, i.e. a part of its background is segmented into its foreground.

Figure 9A:
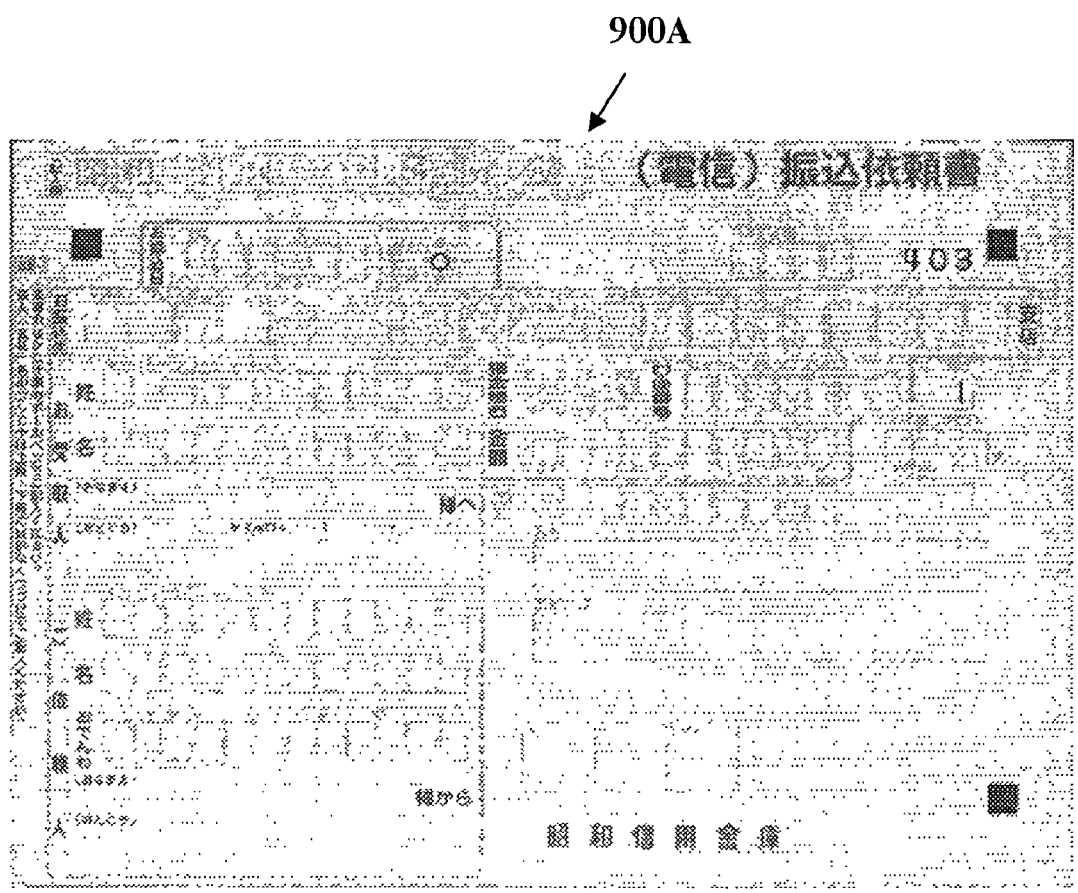
FIG. 9A shows another example of the of an original image, for which edge detection is to be performed.
Figure 10A:
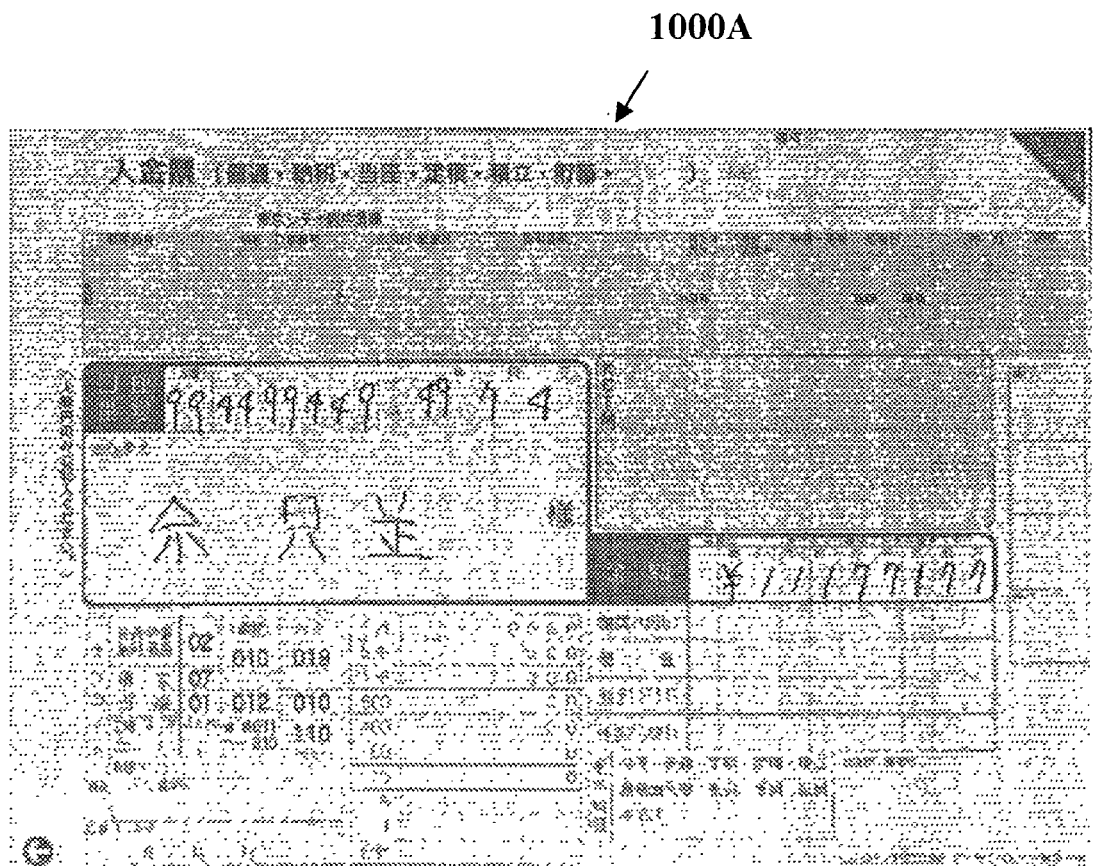
FIG. 10A shows another example of the of an original image, for which edge detection is to be performed.

FIG. 9A and FIG. 10A respectively show an image 900A of type I and an image 1000A of type II.

Back to FIG. 2, the image classifying means 203 classifies the read original image into one of the three image types of 0, I and II.

After that, for an image determined as a type 0 image, the image classifying means 203 supplies the initial segmenting threshold for dividing the gray-level histogram of the image into a foreground and a background to the edge criterion determining means 205, and the edge criterion determining means 205 determines a gray-level statistical average of the foreground and the background of the image, as will be described later.

For an image which is classified as an image of type I or type II, the initial segmenting threshold for dividing the background and foreground of the gray-level histogram of the image is adjusted by the segmentation threshold determining means 204, so as to determine an appropriate segmenting threshold fore dividing the foreground and background of the image, as will be described later. then, the edge criterion determining means 205 calculates a gray-level statistical average of the background and the foreground of the image based on the segmenting threshold of the foreground and background of the image determined. Based on the calculated gray-level statistical average of the foreground and background, the edge criterion determining means 205 determines an image edge criterion, as will be explained later.

Finally, the image edge extracting means 206, based on the image edge criterion calculated by the edge criterion determining means 205, determines whether each of the pixels in the image is an edge pixel, obtains an edge image on the basis of the determined edge pixels, and supplies the obtained edge image to an output device such as the monitor 105 or the printer 104, as will be explained later.

Image Edge Detecting Process

Figure 3:
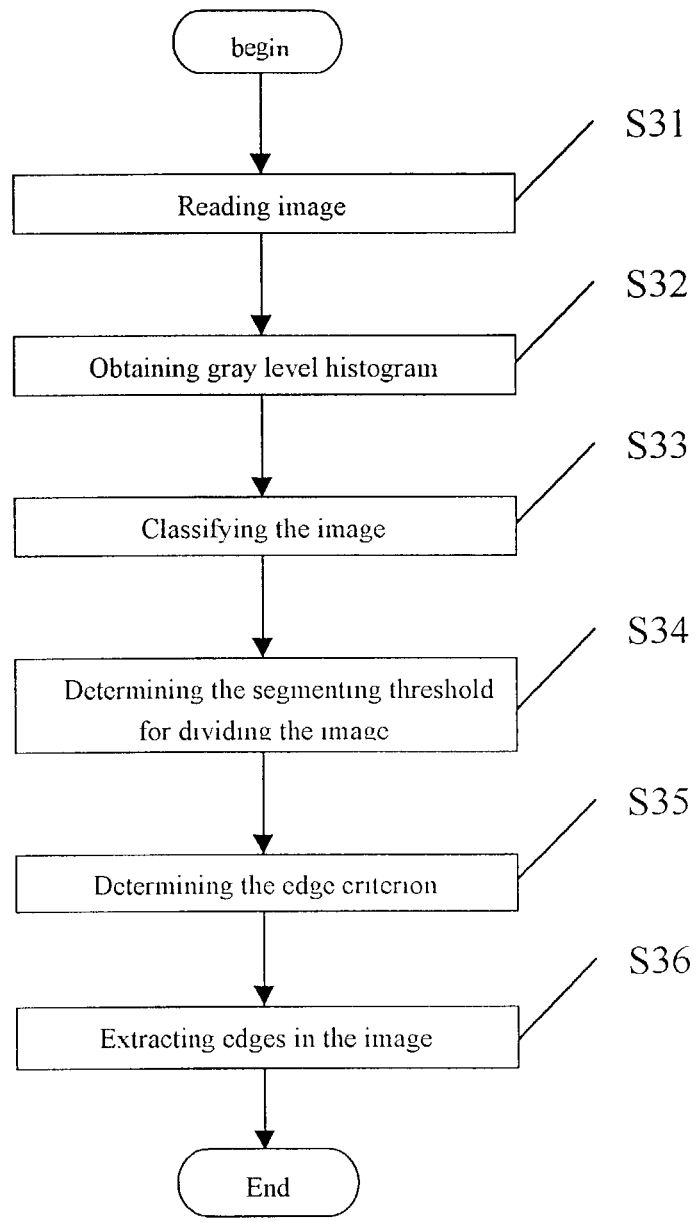
FIG. 3 is a flow chart showing the image edge detecting process according to the first embodiment of the present invention.

FIG. 3 is flowchart showing the process of image edge detection according to the first embodiment of the present invention. A process for detecting edges in an image will be described in detail below with reference to FIGS. 3 and 8A. FIG. 8A is an example of an original image, which is an image of a newspaper and for which edges are to be detected. It is a multiple-value image read by an image input device such as an image scanner, a digital camera, or the like, and it is stored in a predetermined location of a storage device such as ROM 110, HD 107, or RAM 109 or the like. In general, the read image can be stored using different methods, such as 32-bit full colored image, etc. In addition, the image can be stored in different formats, such as BMP, JPEG or TIFF etc. before processing the inputted original image, the original image is converted into a gray-level image, for example, a gray-level image having gray-levels from 0 to 255.

Referring to FIG. 3, first, in step S31, the reading means 201 reads out the gray-level of each pixel in the original image 800A, from which edges are to be extracted. If the original image 800A is encoded using such as JPEG, reading means 201 will decode the image data before reading them. Of course, the gray-levels of the pixels in each column of the original image can be read either simultaneously or sequentially.

Figure 8B:
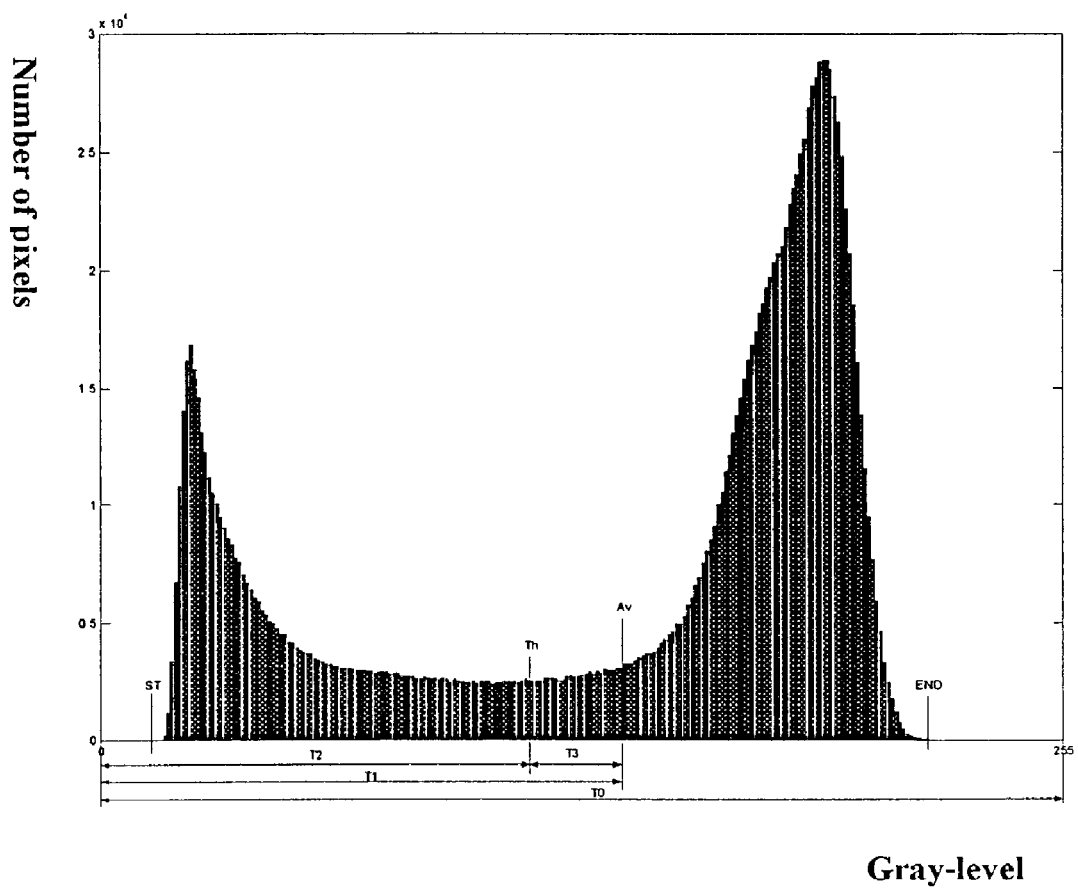
FIG. 8B shows a histogram of an image for which edges are to be detected.

After step S31, the flow goes to step S32, where the image gray-level statistical means 202, where gray-level statistical means 202 performs a statistical process for the gray-level of each of the pixels of the original image 800A read by the image reading means 201 and calculates the number of pixels of original image 800A at each gray-level value. Based on the calculated number of pixels at each gray-level value, an image pixel gray-level histogram 800B of the original image 800a is generated, as shown in FIG. 8B. in FIG. 8B, the X coordinate denotes the gray-level of pixels, while the Y coordinate denotes pixel number.

After step S32, the flow goes to step S33, where the image classifying means 203, based on the image pixel gray-level histogram of the original image 800A determined in step S32, determines image features such as the width of the gray-level histogram 800B, the initial segmenting threshold for dividing the foreground and the background of the image, and the gray-level statistical average; and based on these features, the image classifying means 203 classifies the original image into one of the above-mentioned type 0 image, type I image, or type II image. The process for classifying the image will be described in more detail below with reference to FIG. 4.

Figure 4:
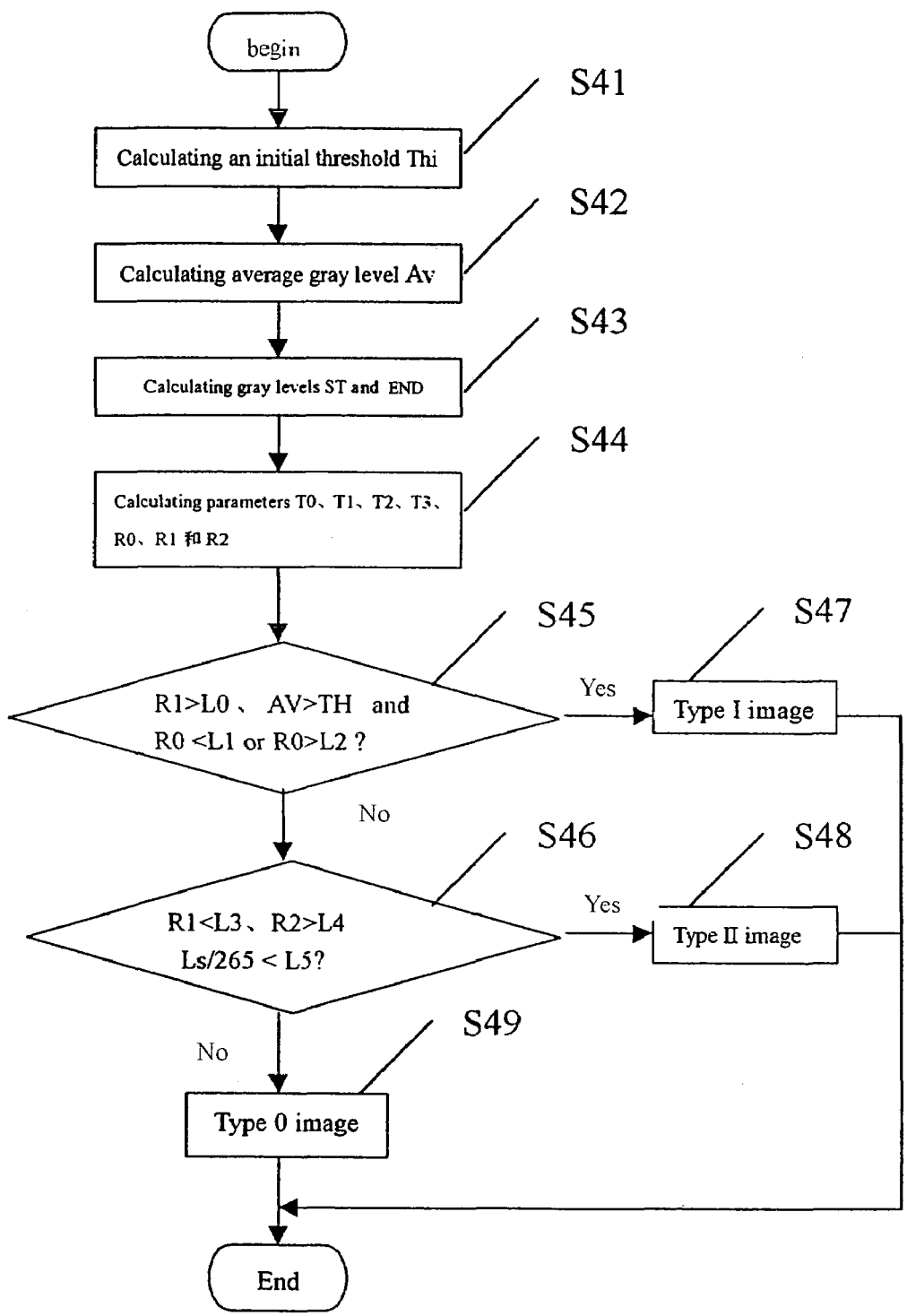
FIG. 4 is a flow chart showing a process for classifying an image.

FIG. 4 is a flowchart for showing the process of classifying an image.

The process for classifying the original image 800a shown in FIG. 8A is described in detail with reference to FIG. 4.

As shown in FIG. 4, in step S41, an initial segmenting threshold Thi for segmenting a foreground and a background in the original image 800A is calculated according to the gray-level histogram of the original image 800A determined in step S32. the initial segmenting threshold Thi may be calculated using any known method, such as Otsu method, NiBlack method, least error method or maximum entropy method, etc. Otsu method is used in the present embodiment. As to Otsu method, reference can be made to "A Threshold Selection Method from Gray-level Histograms", IEEE Trans. On System, Man, and Cybernetics, Vol. SMC-9, No.1, pp. 62–66, January 1979.

In the present embodiment, it is calculated that the histogram shown in FIG. 8B has an initial segmenting threshold Thi of 114.

After step S41, the flow goes to step S42, where the statistical average Av of the gray-level of each pixel in the histogram of the original image 800A is calculated. In the present embodiment, it is calculated that the original image 800A shown in FIG. 8 has a statistical average gray-level Av of 138.

Then, the flow goes to step S43, where the gray-level ST of a starting point and the gray-level END of an ending point in the gray-level histogram 800B are determined, so as to eliminate the gray-levels in the front and rear parts of the gray-level histogram 800B, which have no significant influence over the overall calculation of parameters but have undesired influence to the calculation of edge criterion.

As shown in FIG. 8B, the starting point ST and the ending point END can be determined as:

$$K=T^{1/2}/a \quad (1)$$

Where K is the pixel number corresponding to the gray-level of the starting point ST or that of the ending point END of the histogram, T is the total number of pixels of the original image, and a is a predetermined value, such as 50. The value of a can be selected in the range of 20–150.

In the present example, the total number of pixels in the original image 800A is 1508612, a is chosen as 50. Thus, it is determined that the pixel number K corresponding to the gray-level ST of the starting point and the gray-level END of the ending point in histogram 800B is 24.

Referring to FIG. 8B, by comparing the pixel number corresponding to each gray-level value to the parameter K as determined using formula (1) in the direction of ascending gray-level value, the first gray-level value having a pixel number equal to or greater than K can be determined. In the present example, it can be determined that the gray-level ST of the starting point is 13.

Similarly, in the direction of descending gray-level, it can be determined that the gray-level of the ending point of the histogram 800B is 219.

After step S43, the flow enters step S44, where a first decision ratio R0, a second decision ratio R1 and a third decision ratio R2 are calculated based on the pixel the pixel numbers of the original image 800A and its corresponding gray-level histogram.

The first decision ratio R0 is given by formula (2):

$$R0=T1/T0 \quad (2)$$

Where T0 denotes the total pixel number of the original image, i.e. the total number of pixels within the range of gray-level from 0 to 255; T1 denotes the number of pixels included in the range of gray-level from 0 to the gray-level statistical average Av.

In addition, the second decision ratio R1 is given by formula (3):

$$R1=T3/T2 \quad (3)$$

Where T2 denotes the number of pixels included in the range of gray-level from 0 to the initial segmenting threshold Thi of the histogram; T3 denotes the number of pixels included in the range from the initial segmenting threshold Thi to the gray-level statistical average of the histogram.

Moreover, the third decision ratio R2 is given by formula (4):

$$R2=T2/T0 \quad (4)$$

Where T2 denotes the number of pixels included in the range of gray-level from 0 to the initial segmenting threshold Thi of the histogram; T0 denotes the total pixel number of the original image, i.e. the total number of pixels within the range of gray-level from 0 to 255.

From the above, it can be seen that in the calculation of the first, second, and third decision ratio R0, R1, and R2, the counts of the number of pixels all start from the gray-level of zero (0). Similar, in an embodiment, the counts of the number of pixels can also start from the gray-level ST of the starting point. Likewise, all the pixel counts that end at 255 can be replaced with counts that end at the gray-level END of the ending point.

For the present exemplary image, T0=1508612, T1=534299, T2=466423, T3=70384, thus the first decision ratio R0=0.354, the second decision ratio R1=0.151, and the third decision ratio R2=0.309.

After step S44, the flow goes to step S45, where it is determined whether the following relations (5) are satisfied:

$$R1 > L0$$

$$Av > Thi$$

$$R0 < L1 \text{ or } R0 > L2 \qquad (5)$$

Where R0 is the first decision ratio, R1 is the second decision ratio, Av denotes gray-level statistical average of all the pixels, Thi is the initial segmenting threshold, L0 is a first preset value, L1 is a second preset value, and L2 is a third preset value.

In step S45, if the above relations (5) are satisfied, then it is determined that the image is a type I image (step S47). If it is determined that the relations (5) are not satisfied, then the flow goes to step S46.

In the present embodiment, a preferred range of the first preset value L0 is 2–5 and a preferred value of L0 is 3.5; a preferred range of L1 is 0.35–0.5, and a preferred value of L1 is 0.45; a preferred range of L2 is 0.5–0.65, and a preferred value of L2 is 0.55. For the exemplary image 800A, the second decision ratio R1 is smaller than the first preset value L0, so original image 800A is determined as not being a type I image.

Back to step S45 in FIG. 4, after step S45, since it is determined that the original image is not a type I image, the flow goes to step S46, where it is determined whether the following relations are satisfied:

$$R1 < L3$$

$$R2 > L4$$

$$Ls/256 < L5 \qquad (6)$$

Where R1 is the second decision ratio, R2 is the third decision ratio, Ls is the distance between the gray-level END of the ending point and the gray-level ST of the starting point in the histogram. L3, L4 and L5 are the fourth, fifth, and sixth defined values, respectively.

If it is determined in step S46 that the above relations (6) are satisfied, then the image, from which edges are to be extracted, is a type II image (step S48). If it is determined in step S46 that the above relations (6) are not satisfied, then the flow goes to step S49.

In the present embodiment, a preferred range of the fourth preset value L3 is 0.2–1, and a preferred value of L3 is 0.7; a preferred range of the fifth preset value L4 is 0.2–0.5, and a preferred value of L4 is 0.35; a preferred range of the sixth preset value L5 is 0.5–0.85, and a preferred value of L5 is 0.8. For the exemplary original image 800A, R2 is smaller than L4, so relations (6) are not satisfied. Thus, the original image 800A is determined as not being a type II image. So the flow goes to step S49.

In step S49, it is determined that the original image 800A, from which edges are to be extracted, is a type 0 image. That is, the image can be clearly divided into a foreground portion and a background portion using the initial segmenting threshold.

Back to step S33 of FIG. 3, after determining the type of the original image 800A, from which edges are to be extracted, the flow goes to step S34. at step S34, the segmenting threshold for dividing the original image into a foreground and a background is calculated. As to a type I image or a type II image, since it is not properly divided into a foreground and a background, so the initial segmenting threshold needs to be adjusted.

Since the original image 800A is a type 0 image, it can be properly divided into a foreground and a background using its initial segmenting threshold Thi, so there is no need to adjust the initial segmenting threshold of original image 800A.

Figure 5:
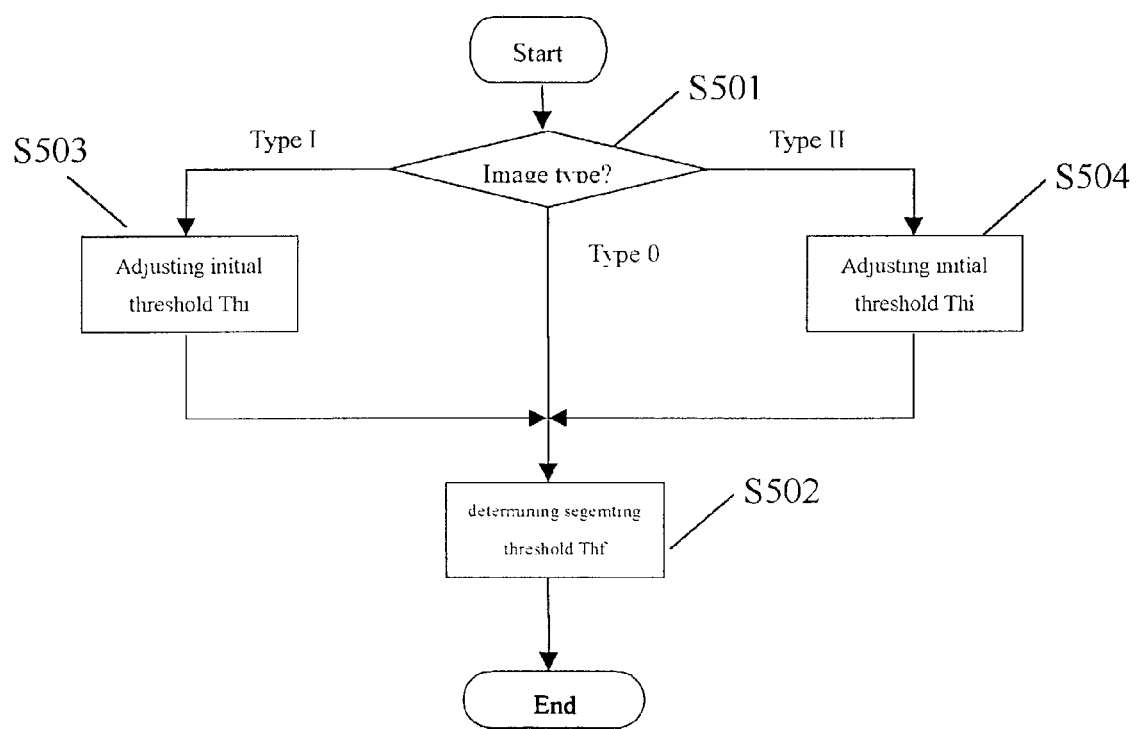
FIG. 5 is a flow chart showing a process for calculating a segmenting threshold for dividing an original image into a foreground and a background.

FIG. 5 is a flowchart showing the process for determining the segmenting threshold for dividing the original image into a foreground and a background. Referring FIG. 5, since the original image 800A is a type 0 image, so the initial segmenting threshold Thi calculated in step S41 is used as the segmenting threshold Thf for dividing the image into a foreground and a background. That is, an appropriate segmenting threshold of the original image 800A is 114.

Back to step S34 in FIG. 3, after step S34, the flow goes to step S35, where edges in the original image 800A are extracted using the segmenting threshold Thf calculated in step S34. Referring to FIG. 8B, in the gray-level histogram 800B, according to its segmenting threshold Thf=Thi, the gray-level statistical average Av1 of all the pixels each having a gray-level smaller than the segmenting threshold Thf (=114 in this example) in the original image 800A can be calculated. Similarly, the gray-level statistical average Av2 of all the pixels each having a gray-level greater than the segmenting threshold (=114 in this example) in the original image 800A can be calculated. In the present example, Av2=177, and Av1=50.

Then, the edge criterion of the image is determined. The edge criterion of the original image can be taken as the difference of gray-level statistical average (Av2−Av1) of pixels on each side of the segmenting threshold for dividing the image into a foreground and a background. In the present example of original image 800A, the edge criterion is (Av2−Av1)=127.

Back to step S35, after step S35, the flow goes to step S36, where it is determined whether a pixel in the original image 800A is an edge pixel in accordance with the edge criterion of the image as obtained above. An operator, such as a Sobel operator, a Prewitt operator, a Roberts Cross operator etc., can be used in determining edge pixels in the image. In the present embodiment, the Sobel method is used in determining edge pixels in the image.

Figure 11:
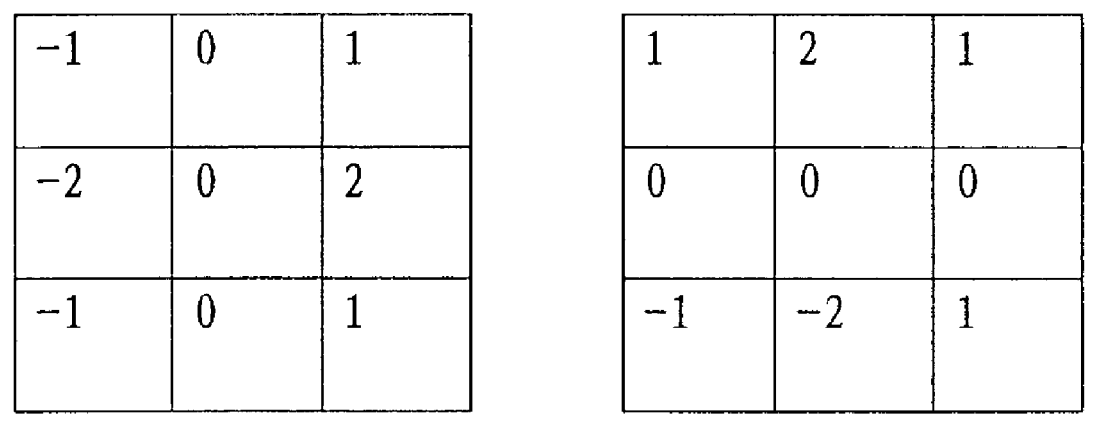

FIG. 11 is a diagram showing a template of a 3×3 Sobel gradient operator.

In an image, an edge exists where the gray-level function or its derivative takes an abrupt change, thus gray-level edges can be detected using first or second order derivative. Equation (7) provides a method for detecting edges in an image using first order derivative based on the 3×3 Sobel gradient operator template as shown in FIG. 13, i.e., using a Sobel operator.

$$g(x, y) = \text{Max}\{gx(x, y), gy(x, y)\} \qquad (7)$$

$$gx(x, y) = |f(x+1, y+1) + 2f(x+1, y) + f(x+1, y-1) -$$
$$f(x-1, y+1) - 2f(x-1, y) - f(x-1, y-1)|$$

$$gy(x, y) = |f(x-1, y-1) + 2f(x, y-1) + f(x+1, y-1) -$$
$$f(x-1, y+1) - 2f(x, y+1) - f(x+1, y+1)|$$

where f(x,y) is the gray-level function of an image, g(x,y) is the maximum of the gradients of gray-level of the image at (x,y), gx(x,y) and gy(x,y) are the components of the gradient of gray-level along x and y directions, respectively.

Using formula (7), the maximum of the gradient of gray-level at each pixel in the maximum of gray-level gradient at each pixel in the original image 800A is determined, and the maximum is compared with the image edge criterion determined in step S35. A pixel having a maximum of gray-level gradient greater than the image edge criterion is determined as an edge pixel. for example, in FIG. 8a, pixel A has a gray-level gradient of 146, which is greater than the image edge criterion of 127, so pixel A is determined as an edge pixel of the image. On the other hand, pixel B has a gray-level gradient of 75, which is smaller than the image edge criterion of 127, so pixel B is not determined as an edge pixel.

Figure 8C:
FIG. 8C shows the result of image edge detection for the original image shown in FIG. 8A according to the first embodiment of the present invention.

After determining all the edge pixels in original image 800A, its edge image can be extracted, thereby obtaining an edge image 800C as shown in FIG. 8C. The edge image 800C is stored in a corresponding location in a storage device, such as RAM 109, so it can be output to an output device such as a monitor or a printer or the like.

It is to be noted that according to the present embodiment, the difference (Av1−Av2) of the gray-level statistical averages on each sides of the segmenting threshold is directly taken as image edge criterion, but the present invention is not limited to this. Without departing from the spirit and scope of the present invention, the image edge criterion can be increased or decreased. for example, an image edge criterion can be taken as (Av1−Av2) multiplied by a coefficient.

FIG. 8C shows the result of image edge extraction performed on the original image 800A shown in FIG. 8A according to the first embodiment of the present invention. It can be seen from FIG. 8C that, by taking as edge criterion the difference between the gray-level statistical averages on each of the two sides of the segmenting threshold for dividing the original image into a foreground and a background, edges in the original image 800A, which includes a photographic picture and a character image, are accurately extracted, thereby obtaining an edge image 800C. It is to be noted that the image of FIG. 8A is obtained by scanning an ordinary newspaper using a scanner.

Image Edge Extraction of a Type I Image

Description will be given below to an image edge extracting process for an original image of determined as a type I image according to the present invention. That is, the process of step S503 of FIG. 5 of the first embodiment will be described in detail.

FIG. 9A is a diagram showing another example of the original image, from which edges are to be detected. In FIG. 9a, an original image 900A is an image of a sheet of financial tables obtained by scanning using image input apparatus such as a scanner. Of course, it can also be inputted to the image edge detecting system using other digital devices, such as a digital camera or the like, and is stored in a location of a storage device such as HD 107 or RAM 109 or the like.

Edge extraction for an original image 900A shown in FIG. 9A is performed using the process of the flowchart shown in FIG. 3.

Figure 9B:
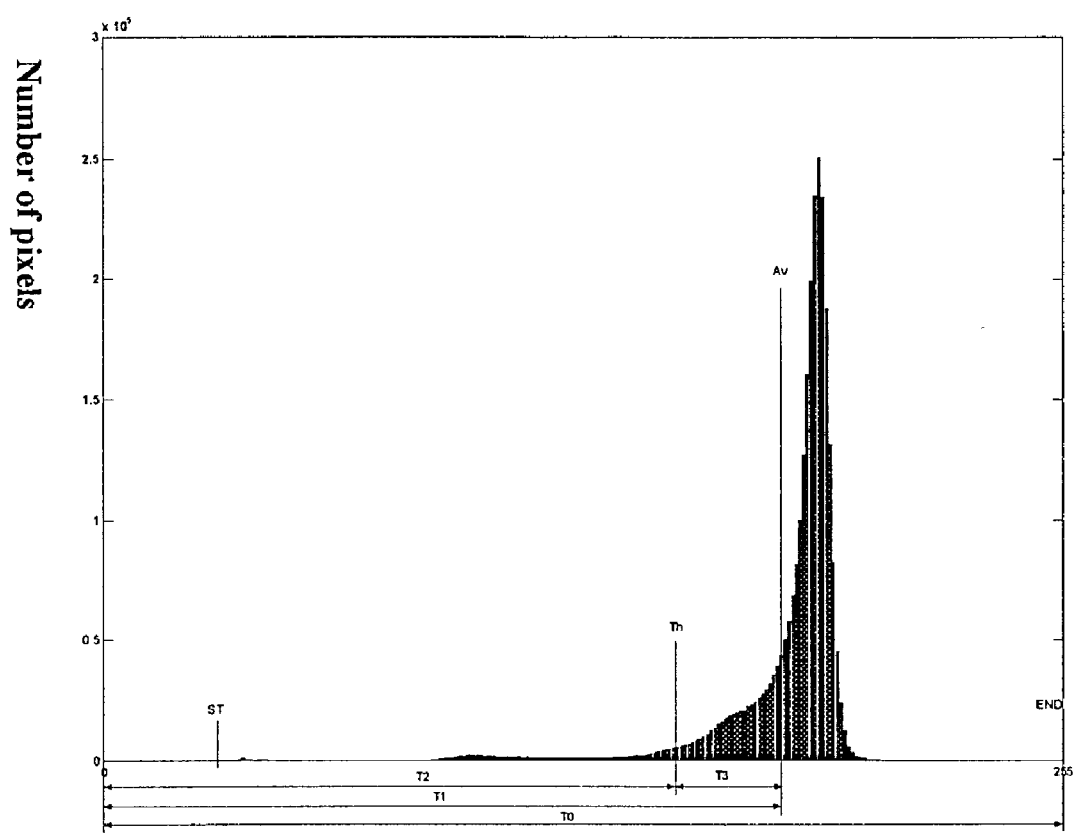
FIG. 9B shows a histogram of the image shown in FIG. 9A.

Referring to FIG. 3, for an original image 900A, at step S31, the gray-level of each pixel of an original image 900A is read. Then, the process goes to step S32, where the number of pixels at each gray-level in an original image 900A is counted, and a histogram 900B is produced, as shown in FIG. 9B. In FIG. 9B, the X coordinate denotes the gray-level of pixels and the Y coordinate denotes the number of pixels.

Then, the flow goes to step S33, where the an original image 900A is classified based on the width of the gray-level histogram 900B, the initial segmenting threshold for dividing the foreground and background in the image, etc. Details of the classification process are shown in FIG. 4.

Referring to FIG. 4, at step S41, using Otsu method, the initial segmenting threshold Thi of the histogram as shown in FIG. 9B can be calculated as 151.

Then, at step S42, the gray-level statistical average Av of pixels in the histogram of the an original image 900A is calculated as 180.

Next, at step S43, the starting point ST of gray-level and the ending point END of gray-level are determined to be 30 and 255, respectively.

After step S43, the flow goes to step S44, where a first decision ratio R0, a second decision ratio R1 and a third decision ratio R2 and other parameters are calculated based on the pixel the pixel numbers of the original image 900A and its corresponding gray-level histogram 900B. Specific data are shown in table 1

TABLE 1

| ST | End | Thi | AV | T0 | T1 | T2 | T3 | R0 | R1 | R2 |
| --- | --- | --- | --- | --- | --- | --- | --- | --- | --- | --- |
| 30 | 255 | 151 | 180 | 2764173 | 740002 | 137977 | 60800 | 0.268 | 4.407 | 0.0499 |

After step S44, the flow goes to step S45, where it is determined whether the histogram 900B as shown in FIG. 9B satisfies relations (5). As can be seen from table 1, since R1>L0, Av>Thi, and R0<L1, relations (5) are satisfied. Thus, the original image 900A is determined as a type I image.

As to a type I image, since the foreground as determined using the initial segmenting threshold Thi is less, so adjustment needs to be made to its initial segmenting threshold, as shown with step S503 of FIG. 5. Details of the adjustment process are described with reference to FIG. 6.

Figure 6:
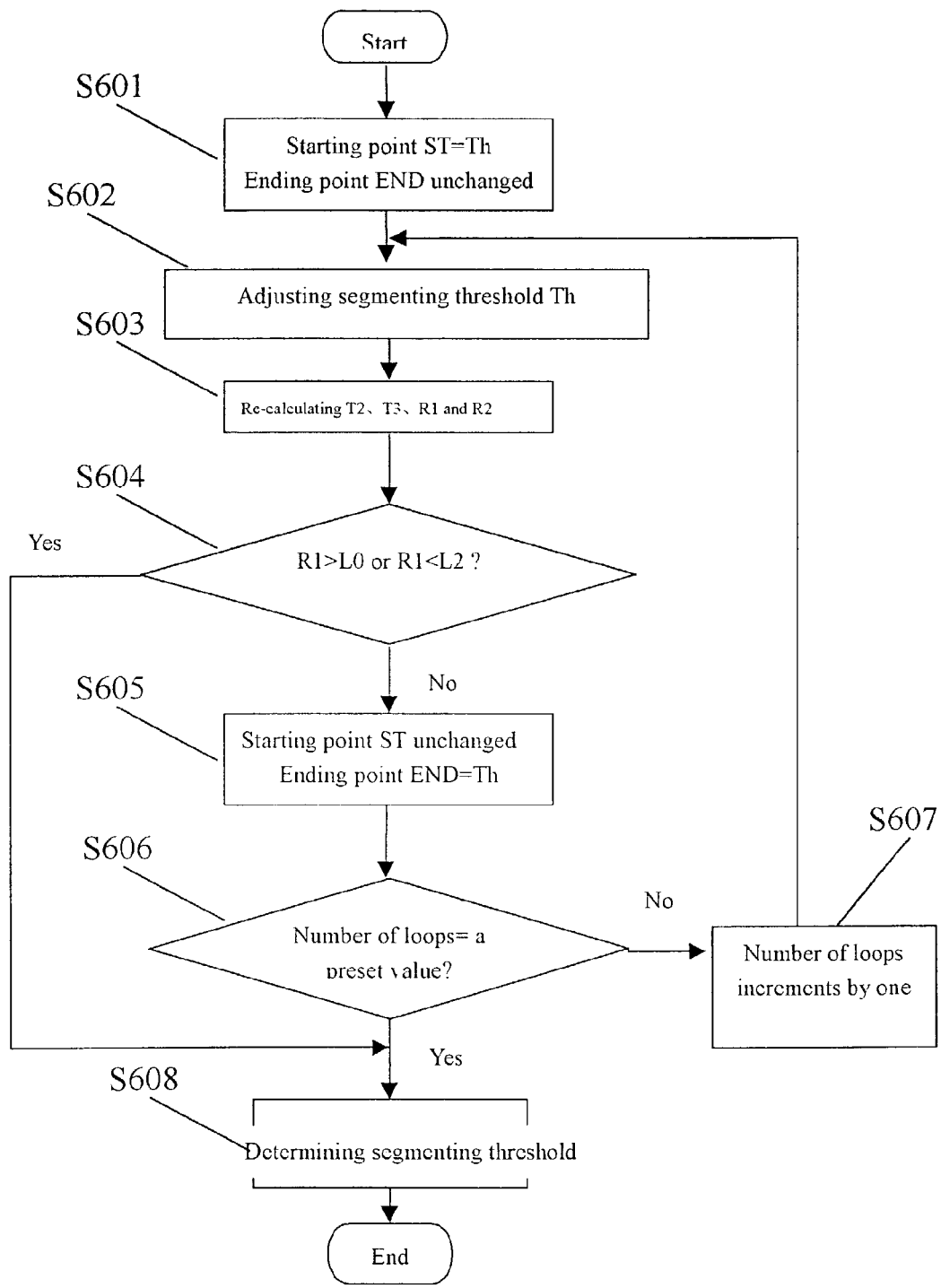
FIG. 6 is a flow chart showing a process for adjusting the image segmenting threshold for a image of type I.

FIG. 6 is a flowchart of a process for adjusting the initial segmenting threshold for dividing the original image of type I into a foreground and a background.

Referring to FIG. 6, after the start of the process, at step S601, a new range of the segmenting threshold is defined, which has a starting point gray-level at the initial segmenting threshold Thi as obtained in step S41 and an unchanged ending point gray-level. In the present example, the new starting point gray-level is 151, and the ending point gray-level is still 255.

Then, the flow goes to step S602, where a new segmenting threshold is determined. In the range from the new starting point gray-level to the ending point gray-level, using NiBlack method, a new segmenting threshold Thm=175 is obtained. Details about NiBlack method can be seen in "Goal-direction Evaluation of Binarization Methods", IEEE Transactions on Pattern Analysis and Machine Intelligence, Vol. 17, No. 12, December 1995, pp 1191–1201. Of course, other methods, such as mean value method, least error method and maximum entropy method, etc., can be used.

After step S602, the flow goes to step S603, where the parameters T2, T3, R1 and R2 are re-determined, as shown in table 2.

TABLE 2

| ST | End | Thm | T2 | T3 | R1 | R2 |
|---|---|---|---|---|---|---|
| 151 | 255 | 175 | 538363 | 231447 | 0.430 | 0.195 |

Then, the flow goes to step S604, where it is determined whether the below relations are satisfied:

$$R1 > L0 \text{ or}$$

$$R1 < L3 \quad (8)$$

Where R1 is the second decision ratio, L0 denotes a first preset value, and L3 denotes a fourth preset value.

If it is determined that relations (8) are satisfied, meaning that the new segmenting threshold is appropriate, the flow goes to step S608, where the new segmenting threshold Thm is taken as the segmenting threshold Thf for dividing the original image into a foreground and a background. If relations (8) are not satisfied, the flow goes to step S605.

At step S605, the range of segmenting threshold is re-determined. Referring to FIG. 6, at step S605, the starting point gray-level ST is kept unchanged, while the gray-level END of ending point is replaced with the new segmenting threshold Thm.

Then, the flow goes to step S606, where it is determined whether the number of cycles for determining the new segmenting threshold Thm exceeds a predetermined number, such as 4.

If the number of cycles does not exceed the predetermined number, the number of cycles is incremented by one, and the flow returns to step S602.

In the present example, see table 2, since the first decision ratio R1 does not satisfy relations (8), the newly obtained segmenting threshold Thm (=175) needs to be re-adjusted, so the flow goes to step S605.

The changes of parameters of the new cycle are shown in table 3:

TABLE 3

| ST | End | Thm | T2 | T3 | R1 | R2 |
|---|---|---|---|---|---|---|
| 151 | 175 | 166 | 320910 | 438649 | 1.367 | 0.116 |

From table 3, it can be seen that the new parameter R1 satisfies relations (8), so the flow goes to step S608. At step S608, the thus calculated threshold Thm=166 is taken as segmenting threshold Thf, that is, it is taken that Thf=166.

Then, back to FIG. 3, after step S34, the flow goes to step S35, where the process determines the edge criterion based on the segmenting threshold Thf obtained in step S34. Details of the process are the same as described with example of FIG. 8a and are not repeated again. For the image 900A, it is calculated Av1=186, Av2=141, thus the edge criterion of the image is determined as (Av2−Av1)=45.

Then, the flow goes to step S36, where it is determined whether a pixel in the an original image 900A is an edge pixel. As details of the determination are the same as those described for original image 800A, description thereof is omitted here. At step S36, an edge image 900C of the original image can be extracted.

Figure 9C:
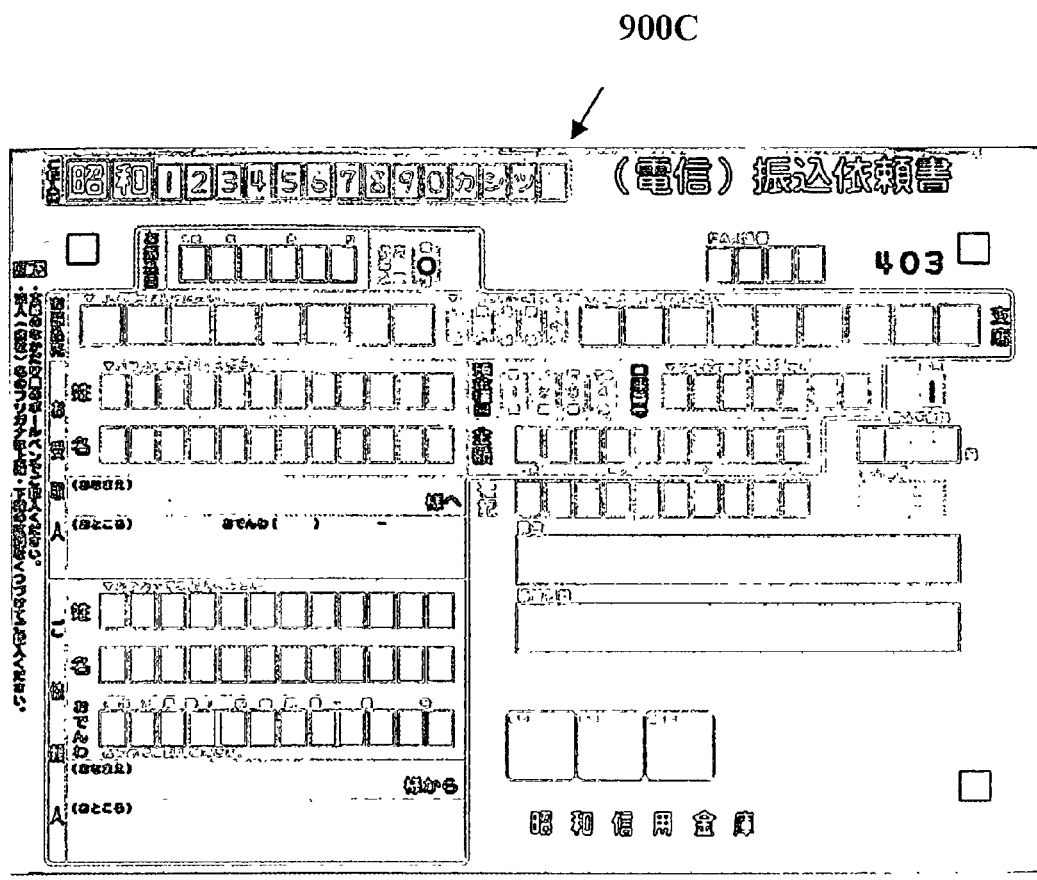
FIG. 9C shows the result of image edge detection of the image shown in FIG. 9A according to the first embodiment of the present invention.

FIG. 9C shows the result of image edge extraction of the an original image 900A of FIG. 9A according to the second embodiment of the present invention. It can be seen from FIG. 9C that since a proper edge segmenting threshold is determined, edge image of an original image 900A containing a financial table is precisely extracted, so a proper edge image 900C is obtained.

Image Edge Extraction of an Original Image of Type II

Description will be given below to the method for extracting edges in an original image determined as a type II image.

FIG. 10A shows another example of original image, from which image edges are to be extracted. In FIG. 10A, an original image 1000A is also an image containing a financial table obtained by scanning using an image input apparatus such as a scanner. Of course, it can also be inputted to the image edge detecting system using other digital devices, such as a digital camera or the like, and is stored in a location of a storage device such as HD 107 or RAM 109 or the like.

Edge extraction for an original image 1000A shown in FIG. 10A is also performed using the process of the flowchart shown in FIG. 3.

Figure 10B:
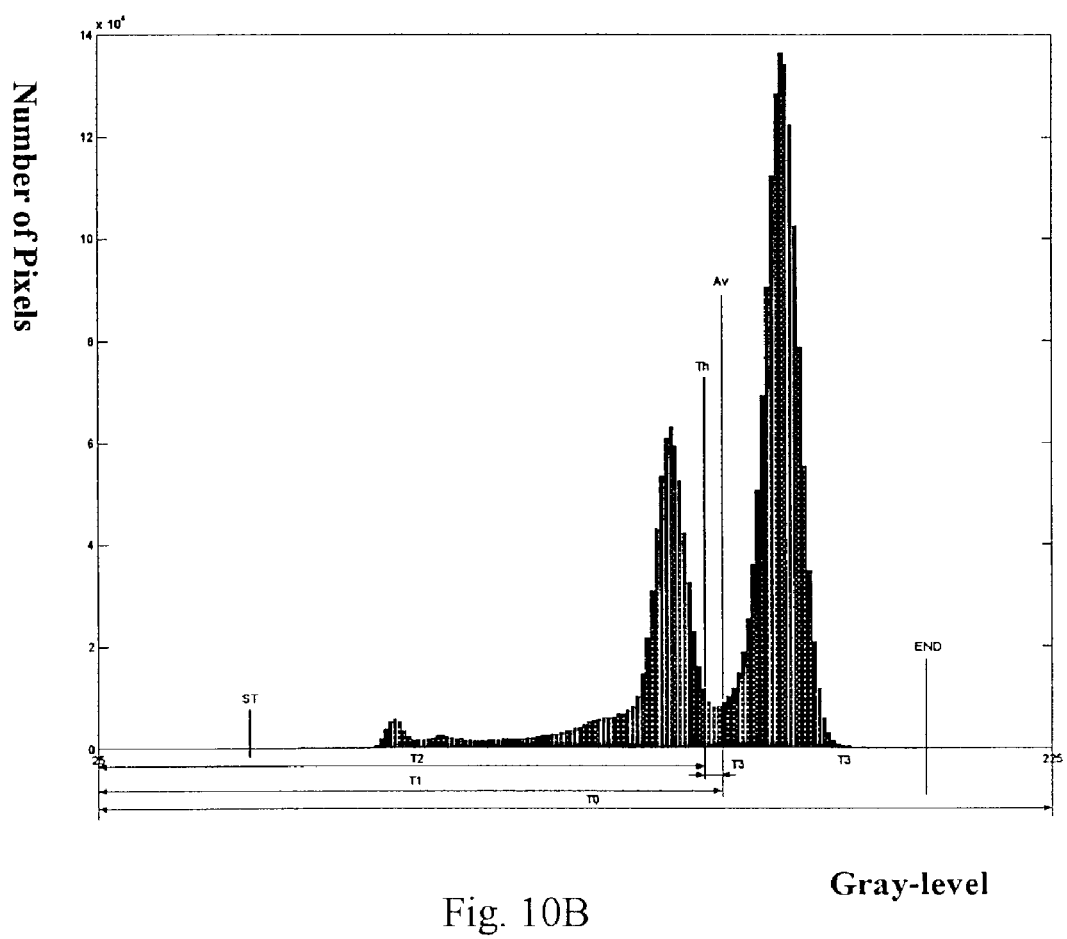
FIG. 10B shows a histogram of the image shown in FIG. 9A.

Referring to FIG. 3, for original image 1000A, at step S31, the gray-level of each pixel of an original image 1000A is read. Then, the process goes to step S32, where the number of pixels at each gray-level in an original image 1000A is counted, and a histogram 1000B is produced, as shown in FIG. 10B. In FIG. 10B, the X coordinate denotes the gray-level of pixels and the Y coordinate denotes the number of pixels.

Then, the flow goes to step S33, where the an original image 1000A is classified based on the width of the gray-level histogram 1000B, the initial segmenting threshold for dividing the foreground and background in the image, etc. Details of the classification process are shown in FIG. 4.

Referring to FIG. 4, at step S41, using Otsu method, the initial segmenting threshold Thi of the histogram as shown in FIG. 10B can be calculated as 153.

Then, at step S42, the gray-level statistical average Av of pixels in the histogram of the an original image 1000A is calculated as 156.

Next, at step S43, the starting point ST of gray-level and the ending point END of gray-level in the histogram 1000B are determined to be 57 and 199, respectively.

After step S43, the flow goes to step S44, where a first decision ratio R0, a second decision ratio R1 and a third decision ratio R2 and other parameters are calculated based on the pixel the pixel numbers of the original image 1000A and its corresponding gray-level histogram 1000B. Specific data are shown in table 4

TABLE 4

| ST | End | Thi | AV | T0 | T1 | T2 | T3 | R0 | R1 | R2 |
|---|---|---|---|---|---|---|---|---|---|---|
| 57 | 199 | 153 | 156 | 2043279 | 759481 | 734000 | 34892 | 0.371 | 0.0476 | 0.359 |

After step S44, the flow goes to step S45, where it is determined whether the histogram 1000B as shown in FIG. 10B satisfies relations (5). As can be seen from table 4, since R1<L0, relations (5) are not satisfied. So the flow goes to step S46, where it is determined whether the histogram 1000B satisfies relation (6). From table 4, it can be seen that R1<L0, R2>L4, and Ls/256=0.57 is smaller than the sixth preset value, so relations (6) are satisfied. Thus, the original image 1000A is determined as a type II image.

As to a type II image, since the background as determined using the initial segmenting threshold Thi is less, so adjustment needs to be made to its initial segmenting threshold Thi, as shown at step S503 of FIG. 5. Details of the adjusting process will be described with reference to FIG. 7.

Figure 7:
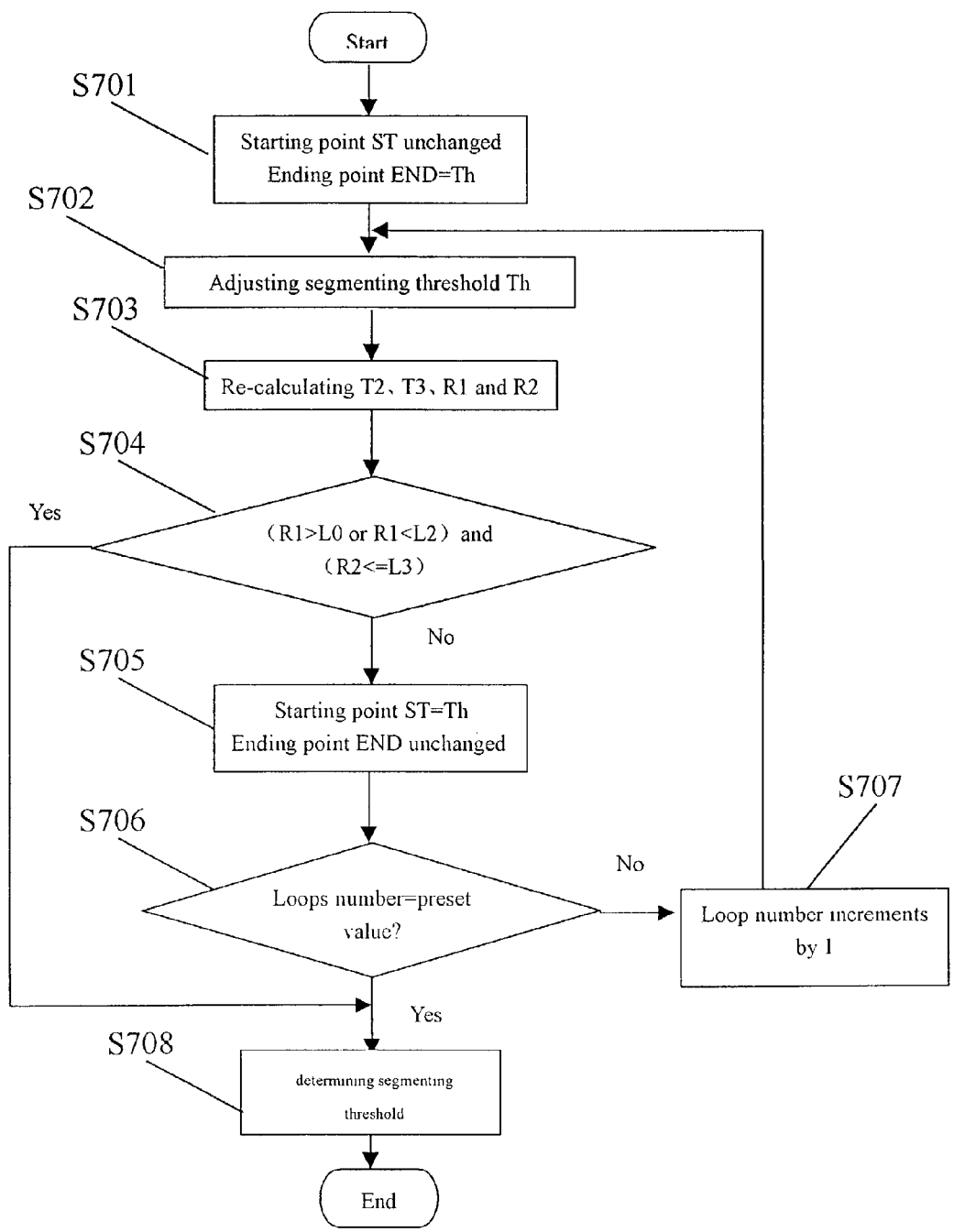
FIG. 7 is a flow chart showing a process for adjusting the image segmenting threshold for a image of type II.

FIG. 7 is a flowchart showing the process for adjusting the image segmenting threshold of a type II image.

Referring to FIG. 7, after the flow begins, at step S701, a new segmenting threshold is determined by taking the initial segmenting threshold Thi as obtained in step S41 as the new ending point gray-level while keeping the starting point gray-level unchanged. In the present example, the starting point gray-level is 56, and the new ending point gray-level is 153.

Then, the process goes to step S702, where a new segmenting threshold Thm is re-determined. For the range from the starting point gray-level to the new ending point gray-level, using NiBlack method, a new segmenting threshold Thm=121 is obtained.

After step S702, the flow goes to step S703, where the parameters T2, T3, R1, and R2 are re-determined, as shown in detail in table 5.

TABLE 5

| ST | End | Thm | T2 | T3 | R1 | R2 |
|----|-----|-----|------|------|-------|--------|
| 56 | 153 | 121 | 99472 | 663177 | 6.678 | 0.0486 |

Then, the flow goes to step S704, where it is determined whether the following relations (9) are satisfied:

R1>L0 or R1<L3

R2<L4            (9)

Where R0 is the first decision ratio, R1 is the second decision ratio, R2 is the third decision ratio, Av denotes gray-level statistical average of all the pixels, Thi is the initial segmenting threshold, L0 is a first preset value, L1 is a second preset value, and L2 is a third preset value.

If it is determined that relations (9) are satisfied, meaning that the new segmenting threshold is an appropriate threshold, then the flow goes to step S708, where the new segmenting threshold Thm is taken as segmenting threshold Thf. If it is determined that relations (9) are not satisfied, then the flow goes to step S705.

At step S705, a new range of the segmenting threshold is determined. Referring to FIG. 7, at step S705, then ending point gray-level END is kept unchanged, while the new segmenting threshold Thm is taken as the gray-level ST of the starting point.

Then, the flow goes to step S706, where it is determined whether number of time of determining the new segmenting threshold exceeds a preset number, such as 4.

If the number of time does not exceed the preset value, then it is incremented by one, and the flow returns to step S702.

In the present example, as shown in Table 5, since the parameter R1 in Table 5 satisfies the relations (9), thus the new segmenting threshold Thm=121, obtained in the first loop of determination, is taken as segmenting threshold Thf.

Then, after step S34, the flow goes to step S35 of FIG. 3, where an edge criterion is determined based on the segmenting threshold Thf obtained in step S34. Details of obtaining the edge criterion is similar to those described with reference to original image 800A and will not be further described here. For image 1000A, it is calculated Av1=159, Av2=99, so the edge criterion of the image is |Av2−Av1|=60.

Next, the flow goes to step S36, where it is determined whether a pixel in the original image 1000A is an edge pixel based on the edge criterion. Details of the process for determining the edge pixel are the same as those described for original image 800A and will not be further described here. At step S36, an edge image 1000C of the original image can be extracted.

Figure 10C:
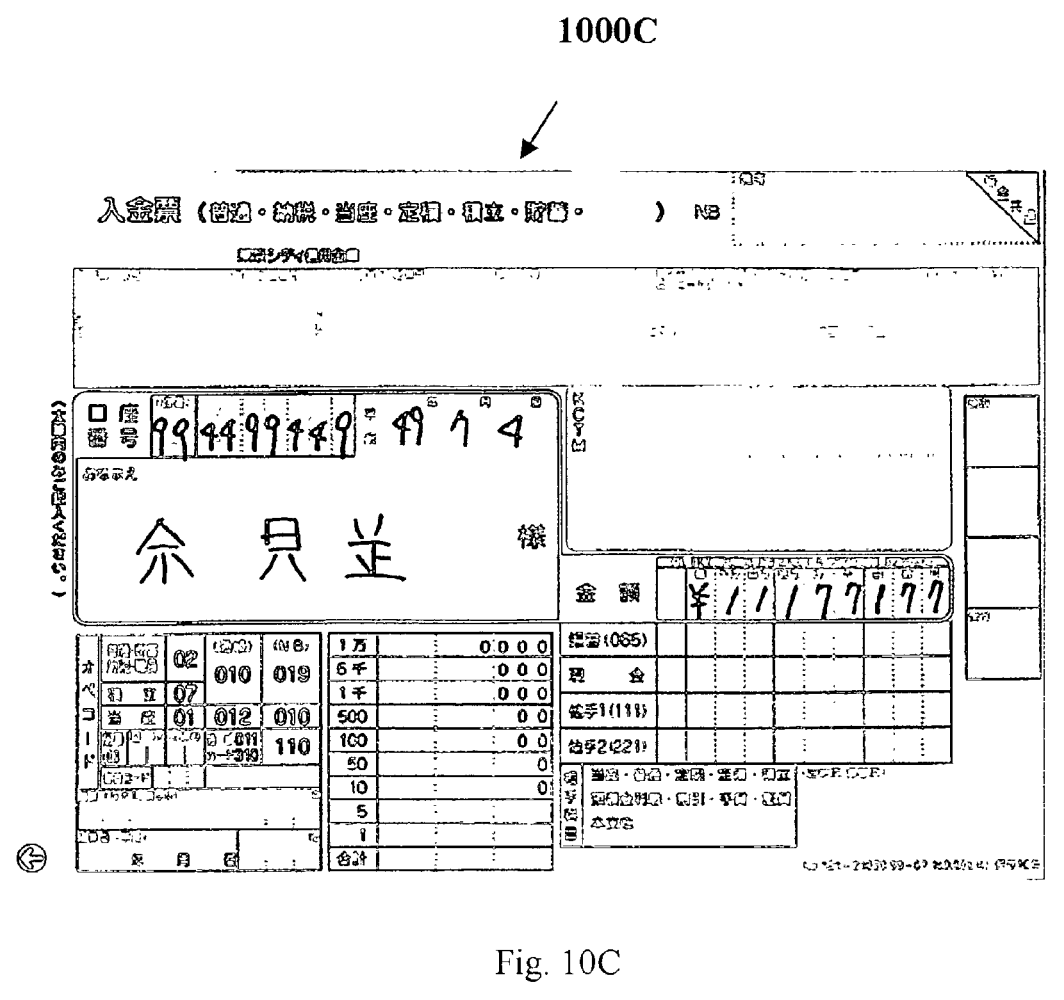

FIG. 10C shows the result of the image edge extraction performed on the original image 1000A shown in FIG. 10A according to the first embodiment of the present invention. From FIG. 10C, it can be seen that, since an appropriate edge segmenting criterion, edges in the original image 1000A, which includes a financial table, are precisely extracted, and a proper edge image 1000C is obtained.

Second Embodiment

Figure 12A:
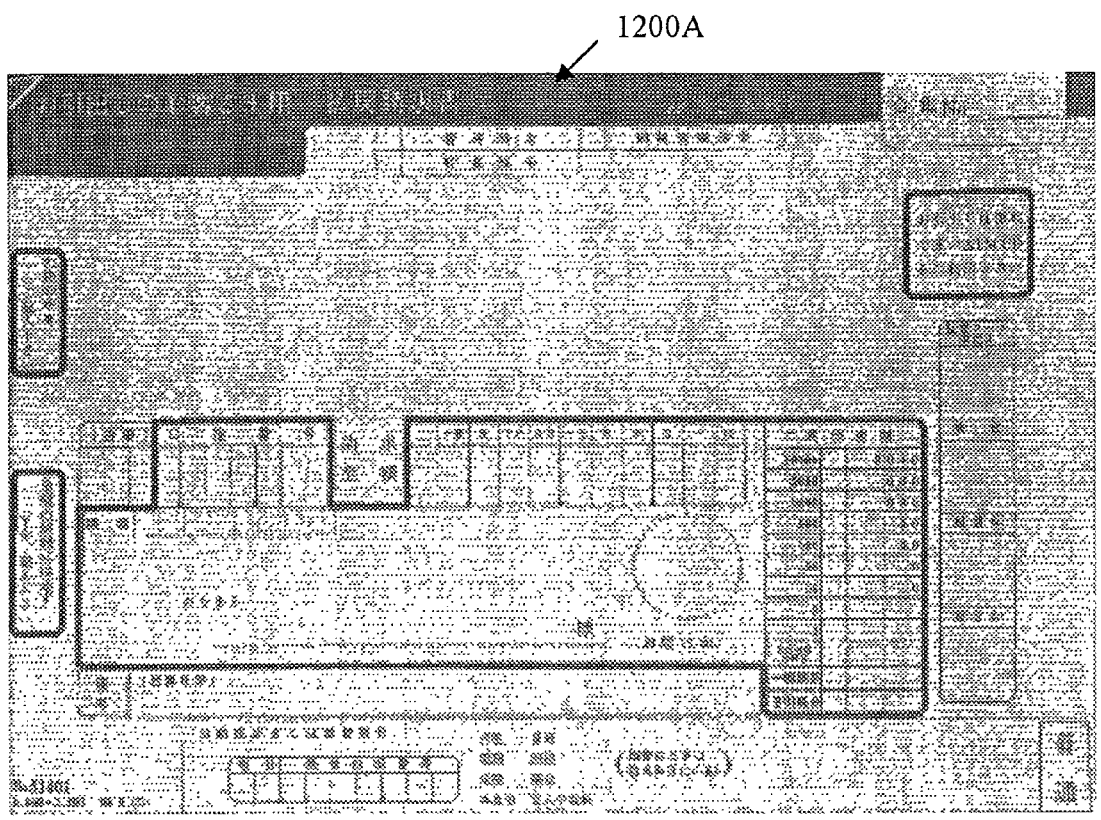
FIG. 12A shows an example of the original image, which is to be detected using the flowchart shown in FIG. 3A.
Figure 12B:
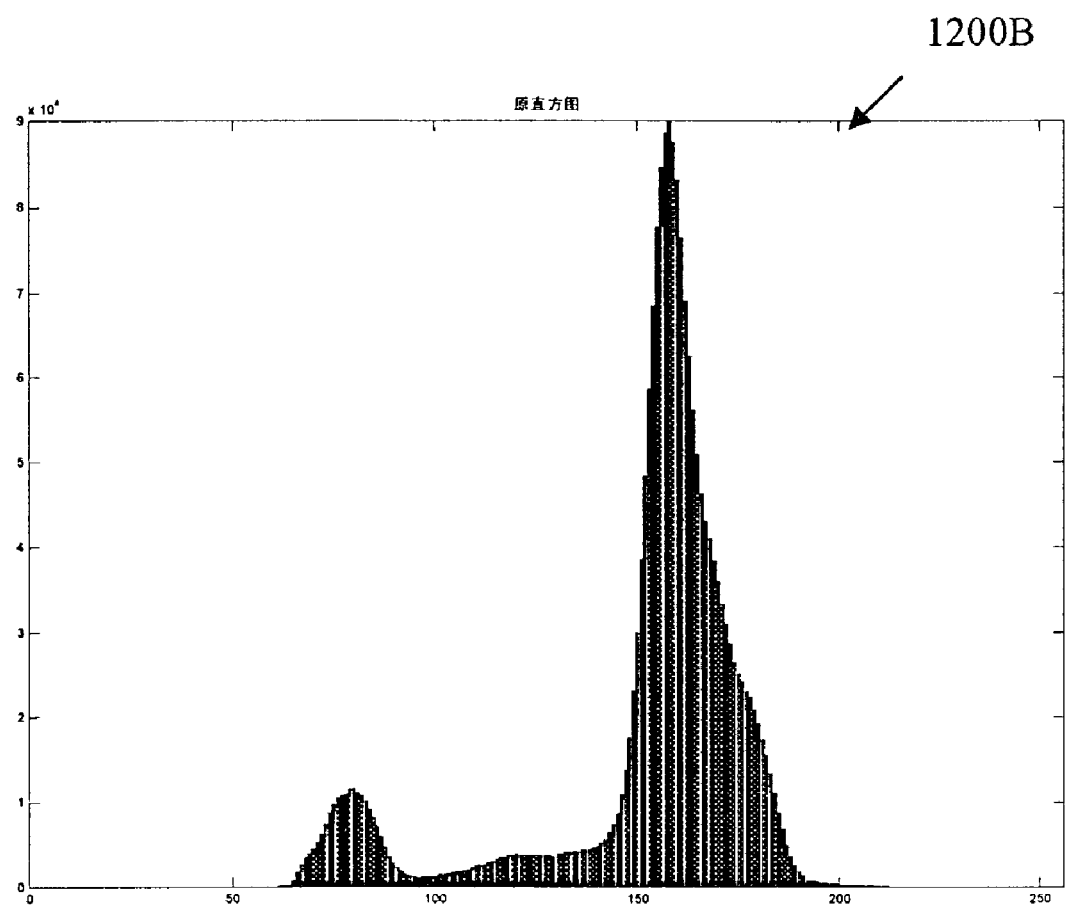
FIG. 12B is a histogram of the original image shown in FIG. 12A.

Due to needs in practical application, such as typesetting etc., an image sometime may contains one or more large title blocks, as shown in FIG. 12A; moreover, an image may further contains some inverted characters (i.e., white characters in black background). Such blocks appear as an independent peak(s) in histogram, such as shown in FIG. 12B, thus changing the distribution of the foreground and background and resulting in undesired effect on finding an appropriate edge criterion.

Figure 3A:
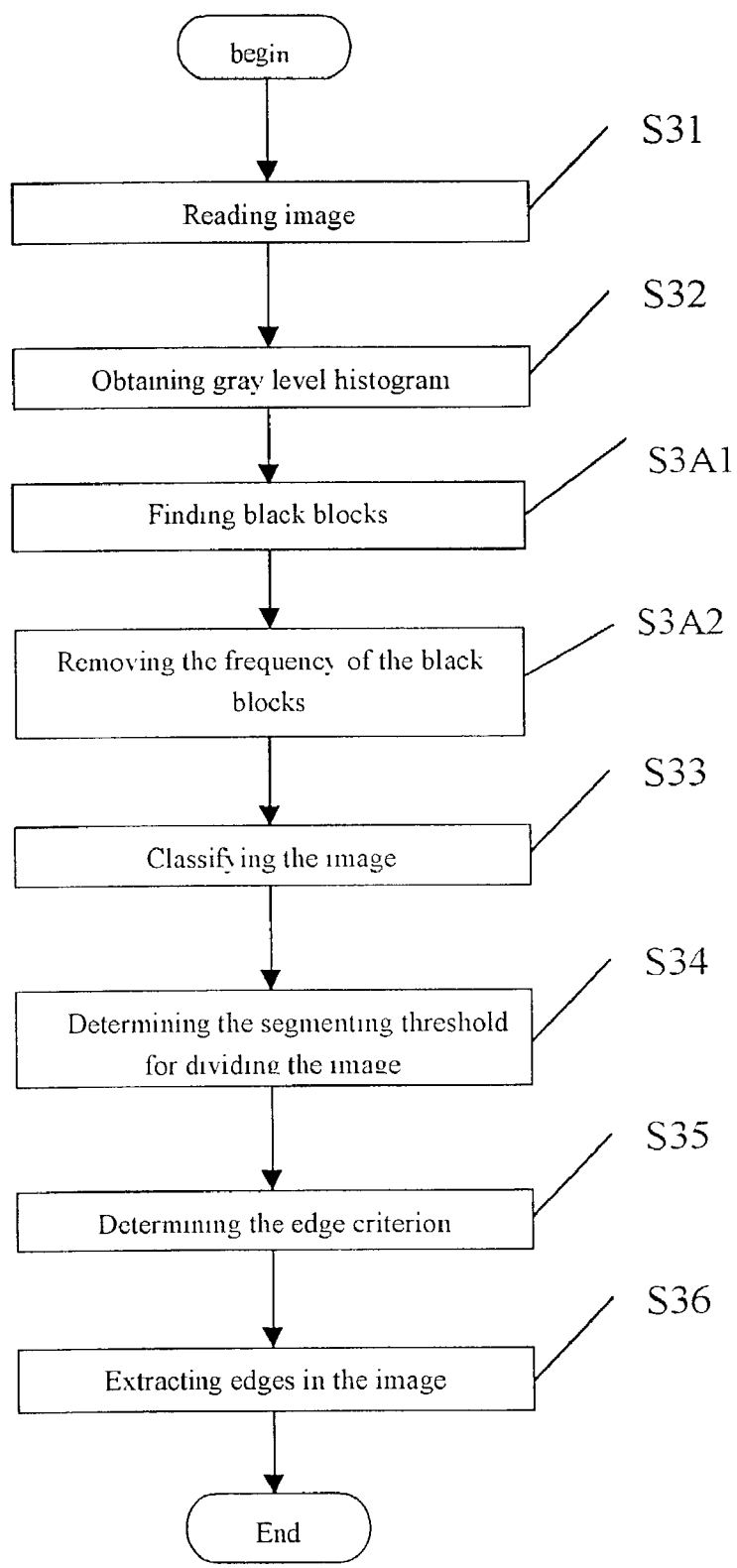
FIG. 3A is the flow chart showing the process according to the second embodiment of the present invention, which is a modification of the flow chart of FIG. 3, wherein the black block detecting step and black block removing step are added.

To solve such problems, a step for modifying the histogram is added into an embodiment as shown in FIG. 3, thereby providing a second embodiment of the present invention, as shown with the flowchart of FIG. 3A.

The image edge detecting system according to the second embodiment differs from the system according to the first embodiment (that is, the system as shown in FIG. 1) only in that the image edge detecting apparatus 114 according to the first embodiment is replaced by the image edge detecting apparatus 114' according to the second embodiment. The remaining portions of the systems are the same, and description thereof is omitted.

Figure 2A:
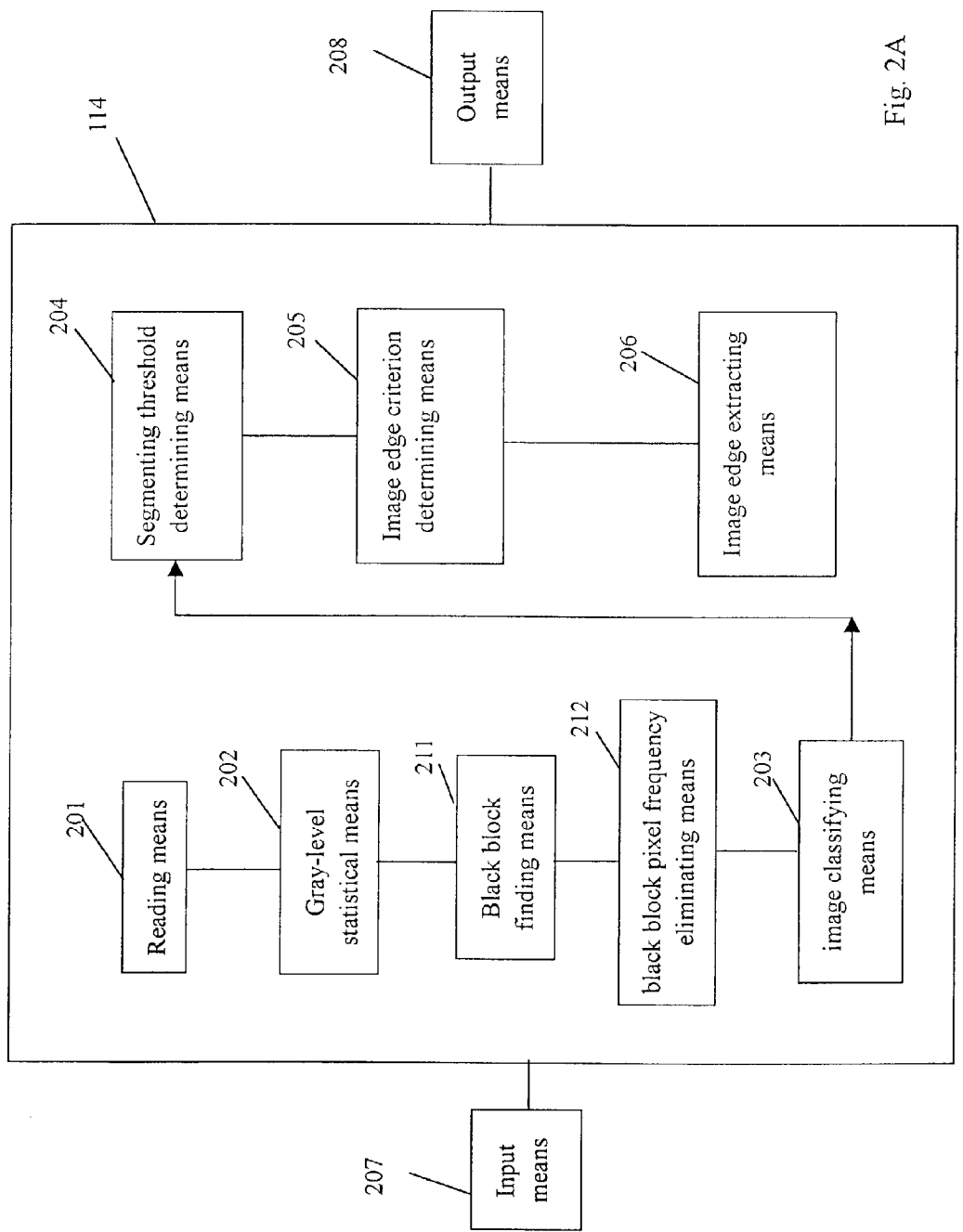
FIG. 2A is a block diagram showing the arrangement of the image edge detecting apparatus of the second embodiment of the present invention.

FIG. 2A shows the block diagram of the structure of the image edge detecting apparatus 114' according to the second embodiment, which includes an image reading unit 201, an image gray-level statistical means 202, a black block finding means 211, a black block pixel frequency eliminating means 212, an image classifying means 203, a segmenting threshold determining means 204, an image edge criterion determining means 205, and an image edge extracting means 206.

The second embodiment will be described below with reference to the original image 1200A shown in FIG. 12A.

Referring to FIG. 3A, at step S31, the image reading means 201 reads the gray-level of each pixel of the original image 1200A, from which edges are to be extracted.

Then, at step S32, image gray-level statistical means 202 performs a statistical process for the gray-level of each of the pixels of the original image 1200A read by the image reading means 201 and determines the number of pixels corresponding to each gray-level in the original image 1200A. According to the number of pixels at each gray-level, an image pixel gray-level histogram 1200B is generated for the original image 1200A, as shown in FIG. 12B. In FIG. 12B, the X coordinate represents the gray-level of pixels, and the Y coordinate represent the number of pixels.

Then, at step S3A1, the black block finding means 211 finds the black block(s) in image 1200A. As a specific method, the image is first divided into small sub-blocks, such as into sub-blocks each consisting of 24×24 pixels, and then each of the sub-block is determined as to whether it is a black block.

As a specific method for determining black blocks, a relatively small threshold can be chosen for the entire image, which threshold can be obtained using any well-known binarizing method, such as Otsu method. If, in one of the sub-blocks, the number of pixels, each having a gray-level smaller than the threshold, exceeds a preset number, then the sub-block is determined as a black block.

Then, area-connecting is performed for the sub-blocks each being determined as a black block, with any simple area-enlarging method, such as a mixed area-enlarging method (details of the mixed area-enlarging method can be found in Section 3.6,2 of "Image Analysis", by Wang, Runsheng, ISBN: 7-81024-3136, but pixels as the basic units to be connected are replaced by small black blocks in the present invention.) There are two main criterions for area-connecting: the first is the spatial closeness of the two portions to be determined as to whether they are an integral black bloc; the second is whether the internal features (such as the ratio of black pixels in each of the portions) of the two portions, which are to be determined as to whether they are an integral black block, have consistency. Finally, a chain table of the positions of all the black blocks in the image is obtained.

Figure 12C:
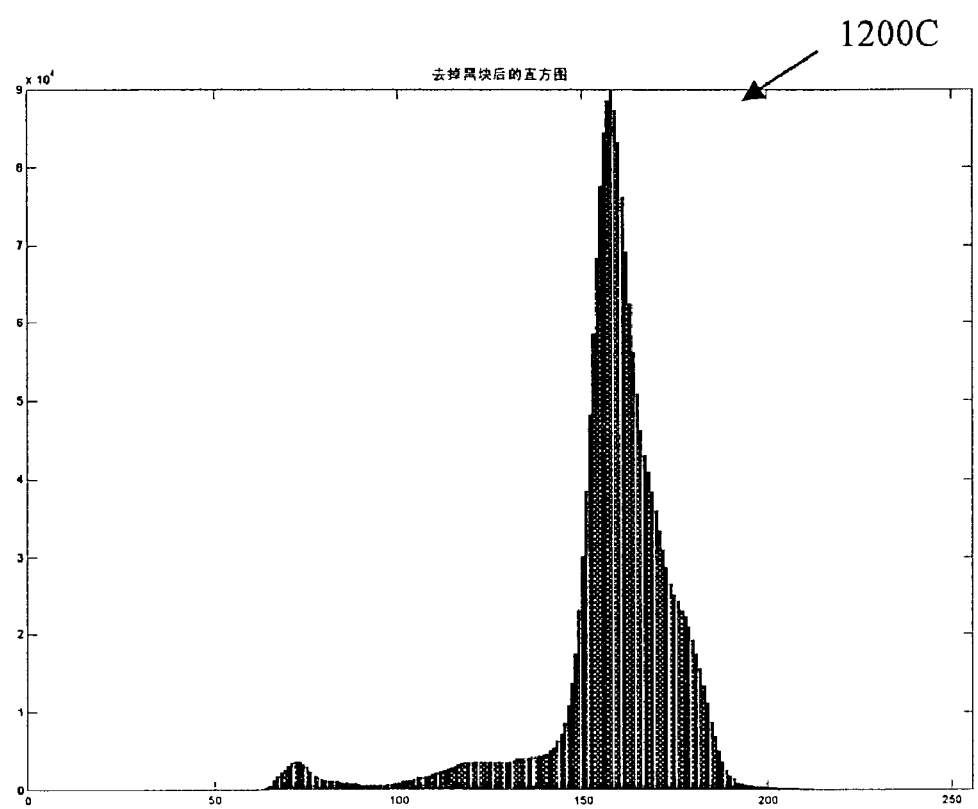
FIG. 12C is a histogram obtained by removing pixels in black block from the original image shown in FIG. 12A.

At step S3A2, the black block pixel frequency eliminating means 212 eliminates the counts of the black blocks of image 1200A from the histogram 1200B of FIG. 12B. As a particular method, an overall histogram of all the black blocks in the chain table of the positions of black blocks obtained in step S3A2 is calculated based on the chain table, and then the overall histogram is subtracted from the image gray-level histogram 1200B for the entire image obtained in step S32, thus obtaining a modified histogram 1200C, as shown in FIG. 12C. It can be seen from FIG. 12C that, since the black blocks are eliminated, the peak on the left in FIG. 12B is lowered.

Steps S33–S36 are similar to those of the first embodiment, so only brief description is given for them, while more specific details of them can be understood by referring to the corresponding description given in the above description to the first embodiment.

At step S33, according to the modified image pixel gray-level histogram 1200C of the original image 1200A obtained in step S3A2, the image classifying means 203 determines image features including the width of the gray-level histogram, a initial segmenting threshold for dividing a foreground and a background of the image, and a gray-level statistical average, etc. and classifies the original image, from which black block(s) has been eliminated, based on these features into a type 0 image, a type I image, or a type II image, as described above. Details of the process of image classification can be understood from FIG. 4 and its relevant description.

At step S34, a segmenting threshold for dividing the original image 1200A, from which a black block(s) has been eliminated, into a foreground and a background. If it is determined in step S33 that the image 1200A having been removed of the black block(s) is not a type 0 image, then the segmenting threshold needs to be adjusted, for the initial segmenting threshold cannot properly divide the image into a foreground and a background for a type I image or a type II image.

At step S35, edges in the original image 1200A are extracted according to the segmenting threshold Thf obtained in step S34. Referring to FIG. 12C, in the gray-level histogram 1200C, according Thf=Thi, the gray-level statistical average Av1 of all the pixels each having a gray-level smaller than the segmenting threshold Thf is calculated. Similarly, the gray-level statistical average Av2 of all the pixels each having a gray-level greater than the segmenting threshold Thf is calculated, thus obtaining an edge criterion (Av2−Av1).

At step S36, based on the image edge criterion obtained as above, it is determined whether a pixel in the image 1200A is an edge pixel. An image edge can be determined using a Sobel operator, a Prewitt operator, or a Roberts Cross operator, etc. In the present embodiment, the Sobel method is used in extracting edges in an image.

Figure 12E:
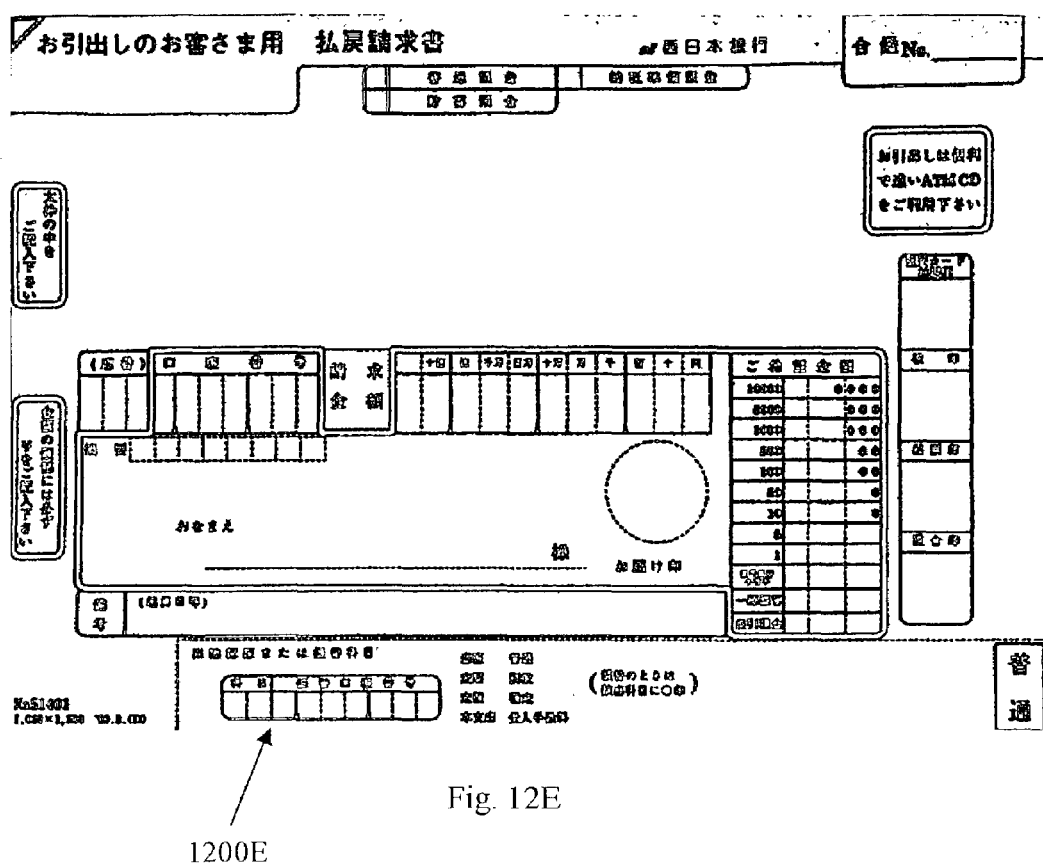
FIG. 12E is the result of edge detection obtained from the original image of FIG. 12A with the flowchart of FIG. 3A.

After determining all the edge pixel in the original image 1200A, an edge image of the original image 1200A can be extracted, thereby obtaining the edge image 1200E as shown in FIG. 12E. The edge image 1200E may be stored in a location of a storage device such as RAM 109 or the like, or it may be outputted to an output device such as a display or a printer or the like.

It is to be noted that according to the present embodiment, the difference (Av1−Av2) of the gray-level statistical averages on each sides of the segmenting threshold is directly taken as image edge criterion, but the present invention is not limited to this. Without departing from the spirit and scope of the present invention, the image edge criterion can be increased or decreased. for example, an image edge criterion can be taken as (Av1−Av2) multiplied by a coefficient.

FIG. 12D shows the result of image edge extraction of the original image 1200A shown in FIG. 12A according to the first embodiment (that is, using the flowchart of FIG. 3) of the present invention. By comparing FIG. 12E and FIG. 12D, it can be seen that, as black blocks have been eliminated prior to classifying an image, the influence of black blocks on the segmenting threshold determination can be eliminated, thus allowing the obtained segmenting threshold to be more appropriate for edge detection of the image to obtained an improved edge image as shown in FIG. 12E. It can be seen clearly from FIG. 12E, that the character edges, which are lost in FIG. 12D, are correctly detected.

It is to be noted that the present invention may be applied to either a system formed by a plurality of devices (e.g., a host computer, an interface device, a reader, a printer, a scanner, and the like), or an apparatus comprising a single equipment (e.g., a copying machine, a facsimile machine, or the like).

The objects of the present invention can also be achieved by supplying a storage medium recording program codes of a software program which can implement the functions of the above embodiments and reading out and executing the program codes stored in the storage medium using a computer (or a CPU or MPU) of the system or apparatus. In such a case, the program codes read out from the storage medium themselves implement the functions of the above embodiments, and the storage medium storing the program codes constitute the present invention.

As the storage medium for supplying the program codes, for example, a floppy disk, a hard disk, an optical disk, a magneto-optical disk, a CD-ROM, a CD-R, a magnetic tape, a nonvolatile memory, a ROM, and the like may be used.

The functions of the above embodiments may be implemented not only by executing the program codes by a computer but also by some or all of actual processing operations executed by an OS (operating system) running on a computer on the basis of an instruction of the program codes.

From the above, it can be seen that the method of the present invention provides an efficient approach for edge detection, and the obtained threshold can be changed according to the particular conditions, thus the method of the present invention can be applied to wider range of applications and having wider applicability. Edges in an image are very important to image processing, so the solutions for precisely obtaining edges have wide applications in binarization, OCR (optical character recognition), engineering image accurate positioning etc.

Moreover, the present invention also includes a situation where, after the program codes read from the storage medium are written in a function expansion card which is inserted into a computer or in a memory provided in a function expansion unit which is connected to the computer, a CPU or the like contained in the function expansion card performs a part of or all the process in accordance with the commands of the program codes and realizes the functions of the above embodiment.

In a situation where the present invention is applied to the above storage medium, the storage medium stores program codes corresponding to the flowcharts (FIGS. 3, 3A, and 4–7) described in the description of the embodiments.

As many apparently widely different embodiments can be made without departing from the spirit and scope of the present invention, it is to be understood that the present invention is not limited to the specific embodiments and is defined only by the appended claims.

The invention claimed is:

1. An image processing method for detecting edges in an original image, characterized in that the method comprises:
   a gray-level statistics step for calculating frequency of gray-level of the original image;
   an image classifying step for classifying the original image based on the calculated frequency;
   a segmenting threshold determining step for determining a segmenting threshold based on the result of the image classifying step, said segmenting threshold being used for segmenting a foreground and a background of the original image;
   an edge criterion calculating step for calculating statistical values for the gray-level of the pixels in the foreground and the background of the original image and calculating an edge criterion based on the statistical values; and
   an edge extracting step for extracting edges in the original image according to the calculated edge criterion.

2. The image processing method of claim 1, characterized in that said image classifying step classifies the image into one of the following image types:
   a first image type corresponding to a normal image;
   a second image type corresponding to an image having an unclear foreground; and
   a third image type corresponding to an image having an unclear background.

3. The image processing method of claim 2, characterized in that said segmenting threshold determining step comprises:
   a calculating step for calculating an initial segmenting threshold by a process for the first image type; and
   an adjusting step for obtaining an adjusted segmenting threshold in accordance with the initial segmenting threshold and the result of said image classifying step.

4. The image processing method of claim 2, characterized in that for an image of the first image type the foreground of the original image as determined in accordance with the initial segmenting threshold is insufficient.

5. The image processing method of claim 2, characterized in that for an image of the first image type the background of the original image as determined in accordance with the initial segmenting threshold is insufficient.

6. The image processing method of claim 4 or 5, characterized in that the method further comprises:
   for said second image type or said third image type, determining the segmenting threshold on the basis of the number of pixels from the initial segmenting threshold to the gray-level statistic average.

7. The image processing method of claim 1 or 3, characterized in that said edge criterion calculating step comprises calculating a statistical average of gray-levels of pixels smaller than said segmenting threshold and a statistical average of gray-levels of pixels greater than said segmenting threshold.

8. The image processing method of claim 1 or 3, characterized in that said edge criterion depends on the difference between the statistical average of gray-levels of pixels smaller than the segmenting threshold and the statistical average of gray-levels of pixels greater than the segmenting threshold.

9. An image forming apparatus for detecting edges in an original image, characterized in that the method comprises:
   a gray-level statistics means for calculating frequency of gray-level of the original image;
   an image classifying means for classifying the original image based on the calculated frequency;
   a segmenting threshold determining means for determining a segmenting threshold based on the result of classification by the image classifying means, said segmenting threshold being used for segmenting a foreground and a background of the original image;
   an edge criterion calculating means for calculating statistical values for the gray-level of the pixels in the foreground and the background of the original image and calculating an edge criterion based on the statistical values; and
   an edge extracting means for extracting edges in the original image according to the calculated edge criterion.

10. A storage medium for storing program codes for image processing, characterized in that the program codes comprises at least:
   codes for calculating frequency of gray-level of an original image;
   codes for classifying the original image based on the calculated frequency;
   codes for determining a segmenting threshold based on the result of the image classification, said segmenting threshold being used for segmenting a foreground and a background of the original image;
   codes for calculating statistical values for the gray-level of the pixels in the foreground and the background of the original image and calculating an edge criterion based on the statistical values; and
   codes for extracting edges in the original image according to the calculated edge criterion.

11. An image processing method for detecting image edges in an original image, characterized in that the method comprises:
- a gray-level statistics step for calculating frequency of gray-level of the original image;
- a black block detecting step for detecting an image area corresponding to a black block in the original image;
- a black block pixel removing step for removing the frequency of pixels in the image area of the detected black block from the frequency of gray-level calculated in said gray-level statistics step;
- an image classifying step for classifying the original image based on the frequency from which the frequency of pixels in the image area of the detected black block has been removed;
- a segmenting threshold determining step for determining a segmenting threshold based on the result of the image classifying step, said segmenting threshold being used for segmenting a foreground and a background of the original image;
- an edge criterion calculating step for calculating statistical values for the gray-level of the pixels in the foreground and the background, from which the black block has been removed, of the original image and calculating an edge criterion based on the statistical values; and
- an edge extracting step for extracting edges in the image according to the calculated edge criterion.

12. An image processing apparatus for detecting image edges in an original image, characterized in that the method comprises:
- a gray-level statistics means for calculating frequency of gray-level of the original image;
- a black block detecting means for detecting an image area corresponding to a black block in the original image;
- a black block pixel removing means for removing the frequency of pixels in the image area of the detected black block from the frequency of gray-level calculated by said gray-level statistics means;
- an image classifying means for classifying the original image based on the frequency from which the frequency of pixels in the image area of the detected black block has been removed;
- a segmenting threshold determining means for determining a segmenting threshold based on the result of said classification, said segmenting threshold being used for segmenting a foreground and a background of the original image;
- an edge criterion calculating means for calculating statistical values for the gray-level of the pixels in the foreground and the background, from which the black block has been removed, of the original image and calculating an edge criterion based on the statistical values; and
- an edge extracting step for extracting edges in the image according to the calculated edge criterion.

13. A storage medium for storing program codes for image processing, characterized in that the program codes comprises at least:
- codes for calculating frequency of gray-level of the original image;
- codes for detecting an image area corresponding to a black block in the original image;
- codes for removing the frequency of pixels in the image area of the detected black block from the frequency of gray-level calculated by said gray-level statistics codes;
- codes for classifying the original image based on the frequency from which the frequency of pixels in the image area of the detected black block has been removed;
- codes for determining a segmenting threshold based on the result of the image classification, said segmenting threshold being used for segmenting a foreground and a background of the original image;
- codes for calculating statistical values for the gray-level of the pixels in the foreground and the background, from which the black block has been removed, of the original image and calculating an edge criterion based on the statistical values; and
- codes for extracting edges in the image according to the calculated edge criterion.

* * * * *

UNITED STATES PATENT AND TRADEMARK OFFICE
CERTIFICATE OF CORRECTION

PATENT NO. : 7,054,485 B2
APPLICATION NO. : 10/193262
DATED : May 30, 2006
INVENTOR(S) : Yulin Li et al.

It is certified that error appears in the above-identified patent and that said Letters Patent is hereby corrected as shown below:

<u>COLUMN 1</u>:
    Line 14, "digital quality" should read -- digital image --.

<u>COLUMN 2</u>:
    Line 16, "step:" should read -- steps: --.

<u>COLUMN 3</u>:
    Line 3, "a image" should read -- an image --;
    Line 20, "a image" should read -- an image --;
    Line 40, "value" should read -- values --; and
    Line 57, "value" should read -- values --.

<u>COLUMN 4</u>:
    Line 8, "bee" should read -- been --;
    Line 16, "value" should read -- values --;
    Line 33, "bee" should read -- been --;
    Line 41, "value" should read -- values --;
    Line 57, "bee" should read -- been --; and
    Line 64, "value" should read -- values --.

<u>COLUMN 5</u>:
    Line 5, "base" should read -- based --;
    Line 30, "the flow" should read -- a flow --;
    Line 41, "a image" should read -- an image --;
    Line 43, "a image" should read -- an image --;
    Line 51, "the of" should be deleted; and
    Line 58, "the of" should be deleted.

<u>COLUMN 6</u>:
    Line 43, "it" should read -- It --;
    Line 62, "an printing" should read -- a printing --; and
    Line 63, "at" should read -- At --.

<u>COLUMN 7</u>:
    Line 7, "if" should read -- If --;
    Line 19, "it" should read -- It --; and
    Line 27, "first," should read -- First, --.

UNITED STATES PATENT AND TRADEMARK OFFICE
CERTIFICATE OF CORRECTION

PATENT NO.       : 7,054,485 B2
APPLICATION NO.  : 10/193262
DATED            : May 30, 2006
INVENTOR(S)      : Yulin Li et al.

It is certified that error appears in the above-identified patent and that said Letters Patent is hereby corrected as shown below:

COLUMN 8 :
    Line 6, "etc. the" should read -- etc. The --;
    Line 35, "fore" should read -- for --;
    Line 36, "then," should read -- Then, --; and
    Line 67, "etc. before" should read -- etc. Before --.

COLUMN 9:
    Line 13, "where gray-level statistical" should be deleted;
    Line 14, "means 202" should be deleted;
    Line 20, "image 800*a*" should read -- image 800*A* --; and
    Line 20, "in" should read -- on --.

COLUMN 10:
    Line 27,"the pixel" (first occurrence) should read -- the pixel, --; and
    Line 59, "Similar," should read -- Similarly, --.

COLUMN 12:
    Line 8, "referring," should read -- Referring to --.

COLUMN 13:
    Line 5, "FIG., 8*a*," should read -- FIG. 8A, --;
    Line 24, "for" should read -- For --; and
    Line 55, "9*a*," should read -- 9A, --.

COLUMN 14:
    Line 26, "table 1" should read -- table 4. --.

COLUMN 15:
    Line 64, "FIG. 8*a*" should read -- FIG. 8A --.

COLUMN 16:
    Line 55, "table 4" should read -- table 4. --.

COLUMN 18:
    Line 4, "is" should read -- are --;
    Line 26, "contains" should read -- contain --; and
    Line 28, "contains" should read -- contain --.

UNITED STATES PATENT AND TRADEMARK OFFICE
CERTIFICATE OF CORRECTION

PATENT NO. : 7,054,485 B2
APPLICATION NO. : 10/193262
DATED : May 30, 2006
INVENTOR(S) : Yulin Li et al.

It is certified that error appears in the above-identified patent and that said Letters Patent is hereby corrected as shown below:

COLUMN 19:
    Line 2, "represent" should read -- represents --;
    Line 7, "sub-black" should read -- sub-blocks --; and
    Line 53, "a initial" should read -- an initial --.

COLUMN 20:
    Line 20, "pixel" should read --pixels --;
    Line 33, "for" should read -- For --; and
    Line 45, "obtained" should read -- obtain --.

Signed and Sealed this

Seventh Day of April, 2009

JOHN DOLL
*Acting Director of the United States Patent and Trademark Office*